(12) United States Patent
Sakurada et al.

(10) Patent No.: US 11,200,759 B2
(45) Date of Patent: Dec. 14, 2021

(54) SUPPORT APPARATUS, SUPPORT METHOD, PROGRAM, AND SUPPORT SYSTEM

(71) Applicant: TOYOTA JIDOSHA KABUSHIKI KAISHA, Toyota (JP)

(72) Inventors: Shin Sakurada, Toyota (JP); Koichi Ando, Nagoya (JP); Mutsumi Matsuura, Okazaki (JP); Masato Endo, Nagakute (JP); Koki Fujita, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/233,008

(22) Filed: Dec. 26, 2018

(65) Prior Publication Data

US 2019/0206149 A1    Jul. 4, 2019

(30) Foreign Application Priority Data

Dec. 28, 2017  (JP) .............................. JP2017-255020
Nov. 29, 2018  (JP) .............................. JP2018-224092

(51) Int. Cl.
| | |
|---|---|
| *G07C 5/00* | (2006.01) |
| *G07C 5/02* | (2006.01) |
| *B60R 25/24* | (2013.01) |
| *H04L 29/08* | (2006.01) |
| *G07C 5/08* | (2006.01) |
| *G06Q 50/30* | (2012.01) |

(52) U.S. Cl.
CPC .............. *G07C 5/008* (2013.01); *B60R 25/24* (2013.01); *G07C 5/02* (2013.01); *G07C 5/0808* (2013.01); *H04L 67/12* (2013.01); *G06Q 50/30* (2013.01)

(58) Field of Classification Search
CPC ...... G07C 5/008; G07C 5/0808; G07C 5/006; G07C 5/0825; G07C 5/0833;
(Continued)

(56) References Cited

U.S. PATENT DOCUMENTS

2009/0309696 A1   12/2009  Tsuruta et al.
2016/0056925 A1    2/2016  Kaneko et al.
(Continued)

FOREIGN PATENT DOCUMENTS

JP    2000201104 A    7/2000
JP    2002342508 A   11/2002
(Continued)

OTHER PUBLICATIONS

English translating of JP2004299587 (Year: 2010).*

*Primary Examiner* — Tuan C To
*Assistant Examiner* — Paul A Castro
(74) *Attorney, Agent, or Firm* — Hunton Andrews Kurth LLP

(57) ABSTRACT

Convenience regarding movement of a vehicle requiring servicing/maintenance is increased. A support apparatus includes acquirer configured to acquire necessity information about necessity/non-necessity of provision of a service related to a vehicle from a terminal of a user of the vehicle, and information manager configured to issue, when the necessity information indicates that the provision of the service is necessary, authentication information for temporarily using the vehicle to an agency providing the service.

11 Claims, 7 Drawing Sheets

(58) Field of Classification Search
CPC ............ G07C 9/00158; G07C 9/00309; G07C 9/00571; B60R 25/24; B60R 2025/1016; B60R 21/01512; B60R 2325/205; B60R 25/04; B60R 25/045; B60R 25/102; B60R 25/2018; B60R 25/33
See application file for complete search history.

(56) References Cited

U.S. PATENT DOCUMENTS

| | | | |
|---|---|---|---|
| 2016/0096508 A1* | 4/2016 | Oz | .......... H04L 67/125 |
| | | | 701/36 |
| 2018/0285832 A1* | 10/2018 | Oz | .......... G07C 5/006 |

FOREIGN PATENT DOCUMENTS

| | | | |
|---|---|---|---|
| JP | 2003041821 A | | 2/2003 |
| JP | 2003208217 A | | 7/2003 |
| JP | 2004299587 A | | 10/2004 |
| JP | 2004299587 A | * | 10/2004 |
| JP | 2005-045501 A | | 2/2005 |
| JP | 2005148842 A | | 6/2005 |
| JP | 2006-206225 A | | 8/2006 |
| JP | 2009298275 A | | 12/2009 |
| JP | 2014058817 A | | 4/2014 |
| JP | 2015031072 A | | 2/2015 |
| JP | 2016046724 A | | 4/2016 |
| JP | 2017118467 A | | 6/2017 |
| JP | 2017183988 A | | 10/2017 |
| WO | 2015002026 A1 | | 1/2015 |

* cited by examiner

SUPPORT APPARATUS, SUPPORT METHOD, PROGRAM, AND SUPPORT SYSTEM

This application claims the benefit of Japanese Patent Application No. 2017-255020, filed on Dec. 28, 2017, and Japanese Patent Application No. 2018-224092, filed on Nov. 29, 2018, which are hereby incorporated by reference herein in its entirety.

BACKGROUND

Technical Field

The present disclosure relates to a support apparatus, a support method, a program, and a support system.

Description of the Related Art

There is proposed a technology for automatically detecting a fault in a vehicle and notifying a driver of a faulty part, and also for retrieving a current location of the vehicle and notifying a service location of the current location, and acquiring and notifying of location information of a repair location nearest to the service location (for example, see Patent document 1). The technology enables appropriate repair of a vehicle with a fault by causing a driver to move the vehicle according to the location information of the nearest repair location in the notification.

CITATION LIST

Patent Document

[Patent document 1] Japanese Patent Laid-Open No. 2005-45501
[Patent document 2] Japanese Patent Laid-Open No. 2006-206225

SUMMARY

In the case described above, if a vehicle for which a notification regarding a faulty part is issued is capable of traveling, a driver having a key to the vehicle is required to drive and move the vehicle to the nearest repair location. In a case where the driver is not familiar with the landform, geographical features, road state and the like of an area where the nearest repair location exists, an agency is desired to collectively perform all work from conveyance of the vehicle to the repair location to completion of repair. Also when a sign of occurrence of a fault is detected or at the time of regular maintenance checkup of a vehicle, a repair agency is also desired to move the vehicle to the repair location. Note that it is expected that such a desire arises not only in a case of repairing a vehicle but also in a case of using various services related to vehicles.

The present disclosure has been made in view of the above circumstances, and has its object to provide a technique for increasing convenience in allowing an agency providing various services related to vehicles to temporarily use a vehicle.

To achieve the object described above, an aspect of the present disclosure is illustrated as a support apparatus. The present support apparatus may include acquirer configured to acquire necessity information about necessity/non-necessity of provision of a service related to a vehicle from a terminal of a user of the vehicle, and information manager configured to issue, when the necessity information indicates that the provision of the service is necessary, authentication information for temporarily using the vehicle to an agency providing the service.

According to such a configuration, a service provider can swiftly repair a vehicle for which it is desirable to provide the service, by using a mobile terminal to which the authentication information is transmitted as a temporary electronic key for using the vehicle. The repair agency can unlock the vehicle by using the mobile terminal which operates as the electronic key, and can operate the vehicle which does not require movement or can move the vehicle to a maintenance location and perform other processes according to a service mode. According to the present disclosure, an agency carrying the terminal to which the authentication information is transmitted is enabled to drive the vehicle as a temporary manager of the vehicle, and convenience is increased. For example, when the service is repair of the vehicle or the like, the support apparatus may recommend the repair according to the state of the vehicle. When a vehicle user consents to the recommendation without the vehicle user finely checking maintenance of the vehicle, an appropriate maintenance service is provided. Burdens regarding maintenance, such as the vehicle user having to be present at the time of maintenance of the vehicle or the vehicle user having to drive the vehicle and hand over the vehicle at the repair location, can be eliminated.

Another aspect of the present disclosure may further include unit configured to detect a repair point of the vehicle, where when the repair necessity information indicates that repair is necessary for the repair point, the information manager may notify a repair agency who performs repair of the repair point of information indicating a state of the vehicle. According to such a configuration, the repair agency can prepare for a repair work based on the information indicating the state of the vehicle, and can increase an estimation accuracy regarding a cost or a time for repair.

Another aspect of the present disclosure may include estimator configured to issue an estimation request to one or more repair agencies, where the information manager may issue the authentication information to a repair agency selected from the one or more repair agencies. According to such a configuration, a repair agency can be selected based on a cost estimated by each repair agency.

According to another aspect of the present disclosure, the key information may include valid period information of the authentication information in accordance with a mode of the repair. According to such a configuration, a use period of the authentication information can be limited. Use of the authentication information beyond the valid period can thereby be prevented.

According to another aspect of the present disclosure, in a case where a notification that the vehicle is locked based on the authentication information that is issued is received, the information management unit may cause the authentication information to expire. According to such a configuration, the authentication information can be made to expire with a notification of locking as a trigger. A repair work on the vehicle for which a repair point is detected can be strictly managed.

Another aspect of the present disclosure may be a support method including a step, performed by a computer, of acquiring necessity information about necessity/non-necessity of provision of a service related to a vehicle from a terminal of a user of the vehicle; and a step, performed by the computer, of issuing, when the necessity information indicates that the provision of the service is necessary, authentication information for temporarily using the vehicle to an agency providing the service.

Another aspect of the present disclosure may be a program for causing a computer to perform a step of acquiring necessity information about necessity/non-necessity of provision of a service related to a vehicle from a terminal of a user of the vehicle, and a step of issuing, when the necessity information indicates that the provision of the service is necessary, authentication information for temporarily using the vehicle to an agency providing the service.

Another aspect of the present disclosure may be a support system including acquirer configured to acquire necessity information about necessity/non-necessity of provision of a service related to a vehicle from a terminal of a user of the vehicle, and information manager configured to issue, when the necessity information indicates that the provision of the service is necessary, authentication information for temporarily using the vehicle to the agency providing the service.

Additionally, the present disclosure may be viewed as a support apparatus or a support system including at least one of the processes or means described above. The present disclosure may also be viewed as a method for executing at least one of the processes performed by the means described above. Furthermore, the present disclosure may be viewed as a computer-readable storage medium storing a computer program for causing a computer to perform the method. The processes and means described above may be freely combined and embodied to the extent that no technical conflict exists.

According to the present disclosure, convenience regarding servicing/maintenance of a vehicle which needs to be repaired can be increased.

DESCRIPTION OF THE EMBODIMENTS

Hereinafter, a vehicle maintenance support system according to an embodiment will be described with reference to the drawings. A configuration of the embodiment described below is only exemplary, and the present vehicle maintenance support system is not limited to the configuration of the embodiment.

<1. System Configuration>

Figure 1:
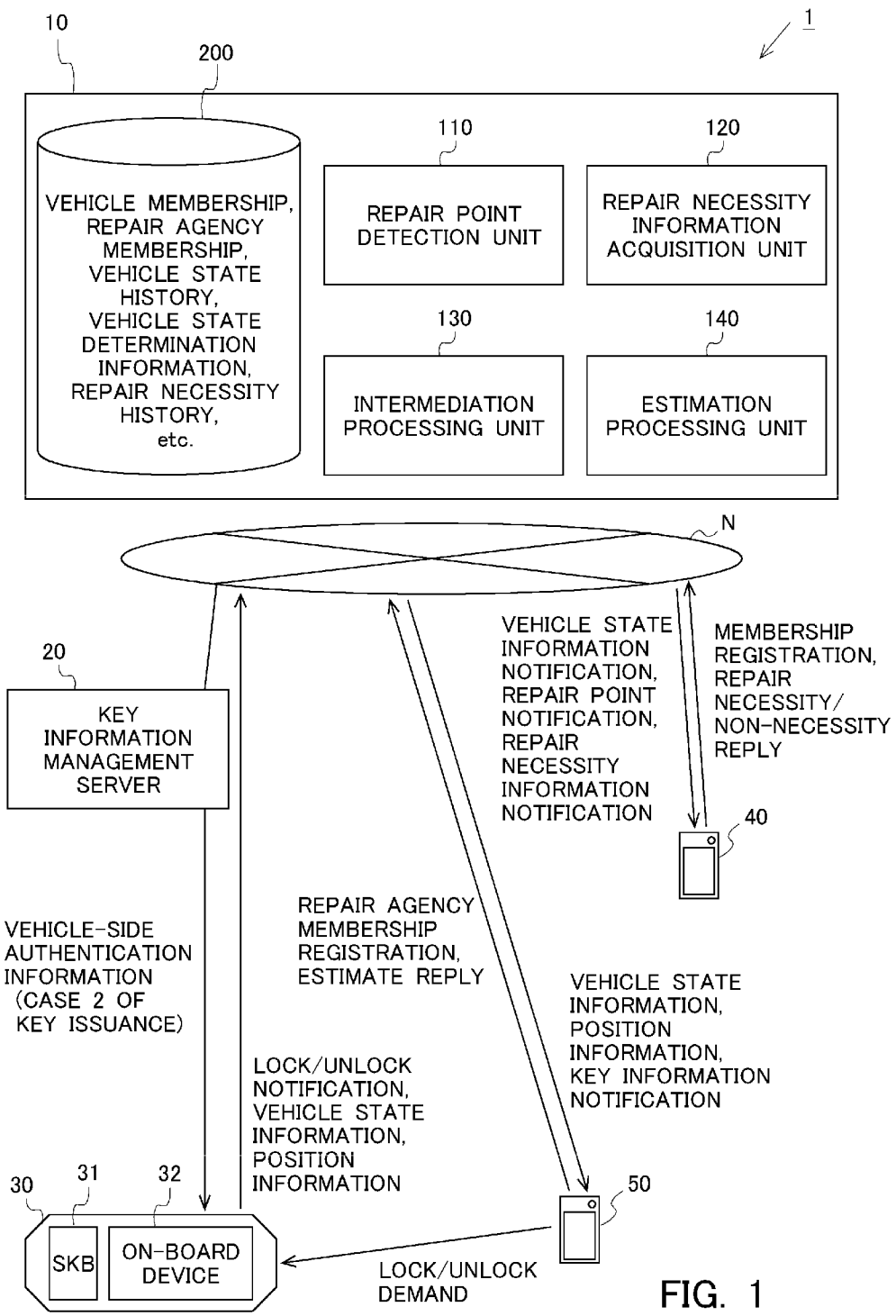
FIG. 1 is a diagram illustrating an example configuration of a vehicle maintenance support system according to an embodiment.

FIG. 1 is a diagram illustrating an example configuration of a vehicle maintenance support system 1 according to the present embodiment. The vehicle maintenance support system 1 illustrated in FIG. 1 includes a vehicle maintenance support server 10 and a key information management server 20. The vehicle maintenance support server 10 (hereinafter also referred to as "maintenance support server 10") is a computer which is used by a support agency that supports intermediation between a vehicle user using a vehicle which is diagnosed as requiring servicing/maintenance and the like, and an agency providing services related to servicing/maintenance of vehicles.

The "support agency" is an agency which provides, as a business, an intermediation support service between a vehicle user of a vehicle which is diagnosed as requiring servicing/maintenance and the like according to the present embodiment, and an agency providing services related to servicing/maintenance of vehicles. For example, the support agency provides an intermediation support service with respect to vehicle maintenance, for vehicles 30 which can be locked/unlocked using an electronic key or a smart key.

Note that the support agency may be the agency providing the services related to servicing/maintenance of vehicles, or an intermediary agency, such as a trading company or a business agency, that intermediates sales of vehicles 30. A rental agency or a lease agency that provides a rental service, a lease service or the like of vehicles 30 may function as the support agency, or a plurality of rental agencies or lease agencies may coordinate to function as the support agency. Alternatively, a coordinated group of agencies among a manufacturer or a dealer of the vehicles 30, a department or a related company of the manufacturer, a trading company or a business agency, a rental agency or a lease agency, and an agency providing services related to servicing/maintenance of vehicles may function as the support agency.

For example, the support agency runs a service site of the maintenance support server 10, and causes a vehicle 30 which can be locked/unlocked using an electronic key or a smart key to coordinate with the key information management server 20 that manages key information which enables movement of the vehicle, and thus provides an intermediation support service related to vehicle maintenance of the vehicle 30. The maintenance support server 10 is an example of a support apparatus.

The maintenance support server 10 at least includes a maintenance support database (DB) 200. The maintenance support server 10 also at least includes each of information processing functions of a repair point detection unit 110, a repair necessity information acquisition unit 120, an intermediation processing unit 130, and an estimation processing unit 140. The maintenance support server 10 here may be a single computer, or may be a system called "cloud" constructed by a group of computers, for example. In the same manner, the maintenance support DB 200 may be constructed by a single or a plurality of database servers.

In the vehicle maintenance support system 1, the maintenance support server 10 is connected to a network N. The network N may be a public network such as the Internet, a wireless network such as a mobile phone network, a dedicated network such as a virtual private network (VPN), or a network such as a local area network (LAN).

The key information management server 20 that manages key information which enables movement of the vehicle 30 is connected to the network N. An on-board device 32 of the vehicle 30 is also connected to the network N. A terminal 40 owned by an owner or a right holder of the vehicle 30 (hereinafter also referred to as "vehicle user") is also connected to the network N. The vehicle user is a key manager who has the key to the vehicle 30. A terminal 50 owned by an agency providing services related to servicing/maintenance of the vehicle 30 (hereinafter also referred to as "maintenance user") is also connected to the network N. Additionally, other key information management servers 20, on-board devices 32 of the vehicle 30, terminals 40 of the vehicle user, and terminals 50 of the maintenance user may be connected to the network N.

For example, the key information management server 20 is an information processing apparatus, such as a personal computer (PC), a workstation (WS) or a server, owned by a management agency managing the key information which enables movement of the vehicle 30. The key information management server 20 may be a single computer, or may be a system called "cloud" constructed by a group of computers, for example. The management agency having the key information management server 20 is a department or a related company of the manufacturer of the vehicle 30, or an agency that performs a key information management task based on a commission from the manufacturer, the support agency or the like, for example. Additionally, the key information management server 20 may form a part of the maintenance support server 10.

The key information management server 20 coordinates with the maintenance support server 10, and generates key information according to a manner of servicing/maintenance of the vehicle 30. The key information here is authentication information for validating a keyless entry function of the vehicle 30 which can be locked/unlocked using smart key information. For example, vehicle-side authentication information and the smart key information for executing the keyless entry system are registered in an authentication unit 31 mounted in the vehicle 30. For example, the vehicle-side authentication information registered in the authentication unit 31 is managed by the key information management server 20 in association with identification information of the vehicle 30 where the authentication unit 31 is mounted.

When there is a demand for issuance of key information from the maintenance support server 10, the key information management server 20 issues, as the key information, authentication information which enables temporary locking/unlocking and moving (driving) of the vehicle 30, based on the vehicle-side authentication information associated with the vehicle 30. For example, the key information is issued as the authentication information such as a one-time key which permits temporary use of the vehicle 30. The following process will be described using the one-time key. The one-time key which is issued is transmitted via the network N to the terminal 50 owned by the maintenance user. The key information management server 20 is an example of the information manager configured to issue the authentication information for temporarily using the vehicle.

When the above-described key information or the authentication information such as a one-time key is input to the authentication unit 31, the authentication unit 31 performs authentication based on the input authentication information such as a one-time key and the vehicle-side authentication information held by the authentication unit 31. In the case of successful authentication, the authentication unit 31 inputs its own smart key information to the keyless entry system by radio waves, and instructs a control system such as ECU to lock/unlock the vehicle or start an engine or a motor that is a power source. Accordingly, the key information of the present embodiment can be authentication information for validating the smart key information included in the authentication unit 31.

For example, when authentication in the authentication unit 31 by the one-time key of the terminal 50 is successful, the maintenance user is enabled to unlock an entrance door of the vehicle 30 through the authentication unit 31, and to get in the vehicle 30 to start an engine.

For example, by using the terminal 50 holding the one-time key as a temporary electronic key, the maintenance user is enabled to perform maintenance checkup at a parking lot where the vehicle 30 is parked, or to move of the vehicle 30 to a vehicle maintenance location by driving the vehicle 30. Vehicle operation using a one-time key, which is necessary at the time of maintenance checkup, can be performed even if the key to the vehicle 30 is not handed from the vehicle user to the maintenance user. The maintenance user is allowed to perform vehicle operation according to a manner of servicing/maintenance of the vehicle 30.

The key information management server 20 may alternatively generate a pair of authentication information, and may issue one piece of the authentication information to the terminal 50 as the key information, and issue the other piece of the authentication information to the authentication unit 31 mounted in the vehicle 30 as the vehicle-side authentication information. For example, the vehicle 30 receives, through the on-board device 32, the other piece of the authentication information issued as the vehicle-side authentication information. For example, the on-board device 32 transfers the other piece of the authentication information to the authentication unit 31 through an in-vehicle network, such as a controller area network (CAN) or a local interconnect network (LIN), in the vehicle 30. The authentication unit 31 may temporarily store the other piece of the authentication information which has been transferred in a memory or the like, as the vehicle-side authentication information corresponding to the key information issued to the terminal 50.

In the case of a mode where a unit (electronic control unit: ECU), mounted in the vehicle 30, that executes the keyless entry function includes a communication function, and a locking/unlocking key and an engine start key for operating the vehicle 30 are exchanged through communication, the key information management server 20 may issue the locking/unlocking key and the engine start key as the key information. The terminal 50 to which the locking/unlocking key and the engine start key are issued is enabled to operate, through communication, the unit that executes the keyless entry function.

Issuance of key information according to a manner of servicing/maintenance may be one or a combination among restriction of a handling target to locking/unlocking of an entrance door or a rear gate, restriction to permission for engine start (releasing of an immobilizer, etc.), and restriction to locking/unlocking of a trunk, for example. In the following, a description will be given assuming that the vehicle 30 is a vehicle on which the authentication unit (smart key box: SKB) 31 that validates the keyless entry function, and the on-board device 32 are mounted, as illustrated in FIG. 1.

For example, the authentication unit 31 of the vehicle 30 includes a communication module which is compatible with Bluetooth (registered trademark) Low Energy (BLE) communication standards. The BLE is low power communication standards of Bluetooth, and is characteristic in that communication can be started by detecting a counterpart appliance. The communication module of the authentication unit 31 may alternatively be compatible with other wireless communication standards, such as near field communication (NFC), ultra-wideband (UWB), or WiFi (registered trademark).

The authentication unit 31 receives, through BLE communication, a one-time key which is transmitted from the terminal 50 temporarily operating as an electronic key of the vehicle 30, the one-time key accompanying a lock demand/ unlock demand. For example, the authentication unit 31 performs authentication in a case where the received one-time key corresponds to the vehicle-side authentication information registered in a memory or the like in advance, and does not perform authentication in a case where the one-time key does not correspond to the vehicle-side authentication information.

The "case where the one-time key corresponds to the vehicle-side authentication information" may be a case where match is determined by simple comparison between the one-time key received by the authentication unit 31 and the vehicle-side authentication information, or a case where predetermined decoded information is obtained by decoding the one-time key received by the authentication unit 31 by the vehicle-side authentication information, for example.

The vehicle-side authentication information corresponding to the key information may be the vehicle-side authentication information registered in a memory or the like in advance, or authentication information generated by the authentication unit 31 by a same algorithm as that used by the key information management server 20, based on date information or identification information of the vehicle. In the case of successful authentication, the authentication unit 31 transmits the radio waves (smart key information) to inside of the vehicle 30, and instructs the vehicle 30 to be unlocked/locked according to a use mode and the engine or the motor that is a power source to be started. Unlocking/locking of the vehicle 30 and start of the power source are performed through the electronic control unit (ECU) connected to the in-vehicle network, such as CAN or LIN, in the vehicle 30.

Unlocking/locking of the vehicle 30 is performed through the ECU connected to the in-vehicle network, such as the controller area network (CAN) or the local interconnect network (LIN), in the vehicle 30. The ECU causes an actuator that opens/closes an entrance door lock or a rear gate, or that opens/closes a trunk lid to operate. The ECU also receives vehicle operation such as engine start for the vehicle 30 the immobilizer of which is released. Vehicle operation of the vehicle 30 is enabled by an instruction from the authenticated terminal 50, for example.

The on-board device 32 is a wireless communication module which is connectable to the network N. The on-board device 32 is connected to the in-vehicle network, such as CAN, in the vehicle 30. For example, the on-board device 32 cooperates with a car navigation device or a global positioning system (GPS) unit, mounted in the vehicle 30, and acquires various types of information such as congestion information, a road state, weather information, and news information related to a current location of the vehicle 30.

In the present embodiment, for example, the on-board device 32 may acquire, via the network N, the vehicle-side authentication information corresponding to the one-time key issued by the key information management server 20.

Furthermore, in the present embodiment, in the case where engine start is permitted for the vehicle 30, the on-board device 32 acquires a vehicle state of the vehicle 30 through the ECU connected to the in-vehicle network. The vehicle state of the vehicle 30 includes a travel distance, an engine state (idling engine speed), a brake state (wear state of brake pad, brake disc), and a battery state (state of charge (SOC), state of health (SOH)). The vehicle state also includes abnormality notification information (warning information), and diagnosis data. The on-board device 32 notifies the maintenance support server 10, via the network N, of the acquired vehicle state information, and position information. Notification of the vehicle state information and the position information of the vehicle 30 is performed at the time of start/stop of the engine and every specific period or every specific travel distance during traveling of the vehicle, for example.

The vehicle user is the owner of the vehicle 30, or a vehicle owner who has control of the vehicle 30. The vehicle user is an individual or a group having possession of the vehicle 30, an organization having control of the vehicle 30, or the like. An organization having control of the vehicle 30 is a company using the vehicle 30 as a company car, an agency providing a car sharing service, or a rental agency or a lease agency providing a rental service, a lease service or the like of the vehicle 30, for example.

The vehicle user has the terminal 40, which is used by an individual or a worker of an organization, for example. The terminal 40 is an information processing apparatus such as a PC, a WS, or a server. The terminal 40 may be a portable information processing apparatus such as a mobile phone, a smartphone, or a tablet PC. The vehicle user performs, through the terminal 40, vehicle membership registration to receive the intermediation support service related to servicing/maintenance of vehicles provided by the maintenance support server 10. Using the terminal 40, the vehicle user also requests for an estimate for servicing/maintenance of the vehicle 30, issues an instruction regarding whether repair is necessary or not, and requests for movement of the vehicle 30 by a third party to a vehicle maintenance location. Additionally, the terminal 40 may include a communication interface capable of communicating with the authentication unit 31 of the vehicle 30.

The maintenance user has the terminal 50, which is used by an agency or a worker of an organization providing services related to servicing/maintenance of the vehicle 30. The terminal 50 is at least a portable information processing apparatus such as a mobile phone, a smartphone, or a tablet PC. The terminal 50 includes a communication interface capable of communicating with the authentication unit 31 of the vehicle 30. The maintenance user performs, through the terminal 50, maintenance agency membership registration to receive the intermediation support service related to servicing/maintenance of vehicles provided by the maintenance support server 10. The maintenance user also performs vehicle operation according to a manner of servicing/maintenance, through the terminal 50 holding the one-time key for using the vehicle 30.

In the maintenance support server 10, the maintenance support DB 200 at least stores vehicle membership information, maintenance agency membership information, vehicle state history information, vehicle state determination information, and repair necessity history information.

The vehicle membership information is membership information of a vehicle user registered in the maintenance support server 10. The vehicle membership information includes identification information for uniquely identifying a vehicle user, an address, contact details, a registration date, the type of the vehicle user, vehicle identification information for identifying the vehicle 30, identification information of the on-board device 32 mounted in the vehicle 30, an insurance number of the vehicle 30, and identification information of the terminal 40. The type of the vehicle user includes information about an individual, a group, an agency or the like. The vehicle identification information includes a model code of the vehicle 30, year of manufacture, a travel distance at the time of registration, an engine displacement, a vehicle type, a serial number, a vehicle registration number plate (car number), and the like. The identification information of the on-board device 32 includes an IP address, a media access control (MAC) address, and the like. For example, the identification information of the terminal 40 includes a telephone number, an IP address, an email address, and a MAC address of the terminal 40, and an identification number of a support service application program (hereinafter also referred to as "support service application") provided by the maintenance support server 10.

The vehicle membership information also includes a term of contract of a support service, a fee schedule, number of times of use, a payment account, and the like. Additionally, the fee schedule may be divided based on a use mode of the support service, use duration, the number of times of use, and the like. The vehicle membership information is registered in the maintenance support DB 200 by the maintenance support server 10 or a computer cooperating with the maintenance support server 10, based on information at the time of membership registration. Alternatively, the vehicle membership information may be registered in the maintenance support DB 200 based on information at the time of membership registration, by a support agency or an administrator of the maintenance support DB 200 with a commission from the support agency.

The maintenance agency membership information is membership information of a maintenance user registered in the maintenance support server 10. The maintenance agency membership information includes identification information for uniquely identifying a maintenance user, a name, a service location of the maintenance user, an address of a maintenance factory, presence/absence of a corporate group which manufactures/sells the vehicles 30, driver license information, contact details, and identification information of the terminal 50. The identification information of the terminal 50 includes a telephone number, an IP address, an email address, and a MAC address of the terminal 50, an identification number of the support service application provided by the maintenance support server 10, and the like. Additionally, the maintenance agency membership information may include identification information, such as an IP address, an email address or a MAC address, of a terminal which receives a request for an estimate.

The maintenance agency membership information includes a term of contract of a support service, a fee schedule, maintenance performance, a driving history, driving performance, a use history, a payment account, and the like. For example, the use history includes the number of times of intermediation through a support service in a predetermined period of time such as one year, identification information, a travel distance, and a movement area of the vehicle 30 for which intermediation was performed, and the like. The use history may include history information indicating the vehicle state at the time of traveling acquired through the on-board device 32, a drive recorder mounted in the vehicle 30, or the like. The fee schedule may be divided based on a use mode of the support service, a time slot, the number of times or the like of servicing/maintenance for which intermediation is performed, and the like. Registration of the maintenance agency membership information in the maintenance support DB 200 is performed in the same manner as the vehicle membership information.

The vehicle state history information is history information about the vehicle state of a vehicle user registered as a vehicle member in the maintenance support server 10. The vehicle state history information at least includes identification information for uniquely identifying the vehicle user, information for specifying the vehicle 30, identification information of the on-board device 32 mounted on the vehicle 30, and the vehicle state of the vehicle 30. For example, the vehicle state of the vehicle 30 includes time information (including year, month and day) and position information at the time of engine start/stop, or the vehicle state information, the position information and the time information sampled every specific period or every specific travel distance at the time of traveling.

The vehicle state determination information is information, regarding the vehicle state of a vehicle user registered in the maintenance support server 10, for providing the intermediation support service related to vehicle maintenance, and is for determining whether a notification regarding servicing/maintenance or repair of the vehicle 30 is to be issued or not. The vehicle state determination information includes information for specifying the vehicle 30, identification information of the on-board device 32 mounted in the vehicle 30, a predetermined period of time, a predetermined distance, and an allowable range regarding the vehicle state. The predetermined period of time is a recommended period of time for regular servicing/maintenance of the vehicle 30, and includes a plurality of periods of time in units of months such as one month, three months, and six months, and in units of years such as one year, two years, and three years. In the same manner, the predetermined distance is a recommended distance for regular servicing/maintenance of the vehicle 30, and includes a plurality of unit distances such as 1000 km, 3000 km, and 10000 km.

The allowable range regarding the vehicle state is a threshold for determining in advance a vehicle abnormality or the like at the time of traveling, and includes numerical data such as ±**** rpm for the idling engine speed, ### mm or less for the brake state, and $$$ % or less for each of SOC and SOH for the battery state. The same applies to the warning information and the diagnosis data. With respect to the warning information and the diagnosis data, a detection frequency (occurrence frequency) or the number of times of detection of the warning information that the allowable range is exceeded or of the diagnosis data may be included, for example. The allowable range regarding the vehicle state may be divided into a plurality of levels. The vehicle state determination information may include a use mode such as use for commuting, the travel distance on a per-year basis, a region of use, and the like.

The vehicle state determination information may be acquired, and accumulated in the maintenance support DB 200, by the maintenance support server 10 or a computer cooperating with the maintenance support server 10 from a website of the manufacturer of the vehicle 30 or the like, by using a computer program such as a search engine. Alternatively, registration in the maintenance support DB 200 may be performed by a support agency or an administrator of the maintenance support DB 200 with a commission from the support agency, based on maintenance information or the like of the vehicle 30 which is open to public.

The repair necessity history information is history information about necessity/non-necessity of repair for a vehicle user registered in the maintenance support server 10. The repair necessity history information includes identification information for uniquely identifying the vehicle user, information for specifying the vehicle 30, time information (including year, month and day) of detection of a repair point, information about the repair point, necessity/non-necessity of repair, information for specifying a maintenance user, presence/absence of an estimate, and the like. The information about the repair point includes the vehicle state, position information and the like at the time of detection of the repair point. The repair point here refers to a part, of the vehicle 30, which is possibly a target for which servicing/maintenance is recommended or a target which is desired to be repaired.

The repair necessity history information may also include a repair mode, such as repair at a factory of the maintenance user, date information (including year and month) of repair, a repair period, presence/absence of a loaner car, and the like. The repair necessity history information is registered in the maintenance support DB 200 by the maintenance support server or a computer cooperating with the maintenance support server 10, based on information at the time of detection of a repair point. Alternatively, registration in the maintenance support DB 200 may be performed by a support agency or an administrator of the maintenance support DB 200 with a commission from the support agency, based on information provided by a commissioned maintenance user.

In the vehicle maintenance support system 1 according to the present embodiment, the maintenance support server 10 detects a repair point of the vehicle 30 based on information stored in the maintenance support DB 200, the vehicle state information from the vehicle 30, and the like. The maintenance support server 10 notifies the terminal 40 of the vehicle user of information including a detected repair point, by the support service application, an email, or a short message service (SMS).

The maintenance support server 10 acquires repair necessity information including information about necessity/non-necessity of repair transmitted from the vehicle user in response to the notification mentioned above, and also selects a maintenance user who is to repair the vehicle 30, when consent is obtained for repair. For example, the maintenance support server 10 notifies a maintenance user, selected from maintenance users registered in advance in the maintenance support DB 200 as maintenance agency members, at least the position information of the vehicle 30, the vehicle state information, information for specifying the vehicle user, and information for specifying the vehicle 30. In the case where the vehicle user wants a repair estimate, the maintenance support server 10 also requests the maintenance user for an estimate. The maintenance support server 10 is an example of acquirer configured to acquire necessity information from a terminal of a user of the vehicle.

(Case 1 of Key Issuance)

The maintenance support server 10 notifies the cooperating key information management server 20 to the effect that the maintenance user for the vehicle 30 is selected. For example, the key information management server 20 issues key information which allows the terminal 50 to function as a temporary electronic key, based on information including the identification information of the vehicle 30 and time information of reception of the notification from the maintenance support server 10. The key information is issued based on the vehicle-side authentication information which is registered in advance in the authentication unit 31 managed by the key information management server 20. For example, the issued key information is transmitted to the terminal 50, through the maintenance support server 10, and causes the terminal 50 to function as a temporary electronic key according to the mode of servicing/maintenance.

(Case 2 of Key Issuance)

The key information management server 20 may generate a pair of authentication information based on the information including the identification information of the vehicle 30 and the time information. In this mode, the key information management server 20 may issue one piece of the pair of authentication information to the terminal 50 as the key information, and may issue the other piece of the authentication information to the authentication unit 31 mounted in the vehicle 30 as the vehicle-side authentication information. In this mode, the authentication unit 31 of the vehicle 30 may receive, through the on-board device 32, the other piece of the authentication information issued by the key information management server 20, and may temporarily store the received authentication information in a memory or the like as the vehicle authentication information, for example.

Additionally, in modes of (Case 1 of Key Issuance) and (Case 2 of Key Issuance) described above, the authentication unit 31 of the vehicle 30 may generate the vehicle-side authentication information corresponding to the key information by the same algorithm as that of the key information management server 20, based on the information including the identification information of the vehicle 30 and the time information of reception of the notification from the maintenance support server 10.

(Case 3 of Key Issuance)

In a mode where the unit (ECU), mounted in the vehicle 30, that executes the keyless entry function is a dedicated unit including a communication function, and a locking/unlocking key and an engine start key of the vehicle 30 are exchanged through communication, the key information management server 20 may issue, as the key information, the locking/unlocking key and the engine start key being managed. In this mode, exchange of the issued key information is directly performed between the dedicated unit and the terminal 50 through communication, and thus, an authentication process by the authentication unit 31 is not performed in between.

The maintenance user executes the support service application, and causes the terminal 50, which received the key information, to operate as a temporary electronic key for using the vehicle 30. The authentication unit 31 of the vehicle 30 receives, through BLE communication or the like, the key information which accompanies a lock demand/unlock demand for the vehicle 30, and which is transmitted from the terminal 50, and performs authentication under a condition that the received key information corresponds to the vehicle-side authentication information stored in a memory or the like (Cases 1, 2 of Key Issuance). The maintenance user unlocks the vehicle 30 by using, as a temporary smart key, the terminal 50 which is successfully authenticated, and performs vehicle operation necessary for a repair work for a detected repair point.

Alternatively, the maintenance user performs exchange of the locking key/unlocking key and the engine start key issued as the key information between the terminal 50 and the dedicated unit, unlocks the entrance door and gets inside the vehicle, releases the immobilizer and starts the engine, and performs vehicle operation necessary for a repair work for a detected repair point (Case 3 of Key Issuance). With the vehicle maintenance support system 1 according to the present embodiment, convenience regarding servicing/maintenance of a vehicle requiring repair is increased.

<2. Device Configuration>

Figure 2:
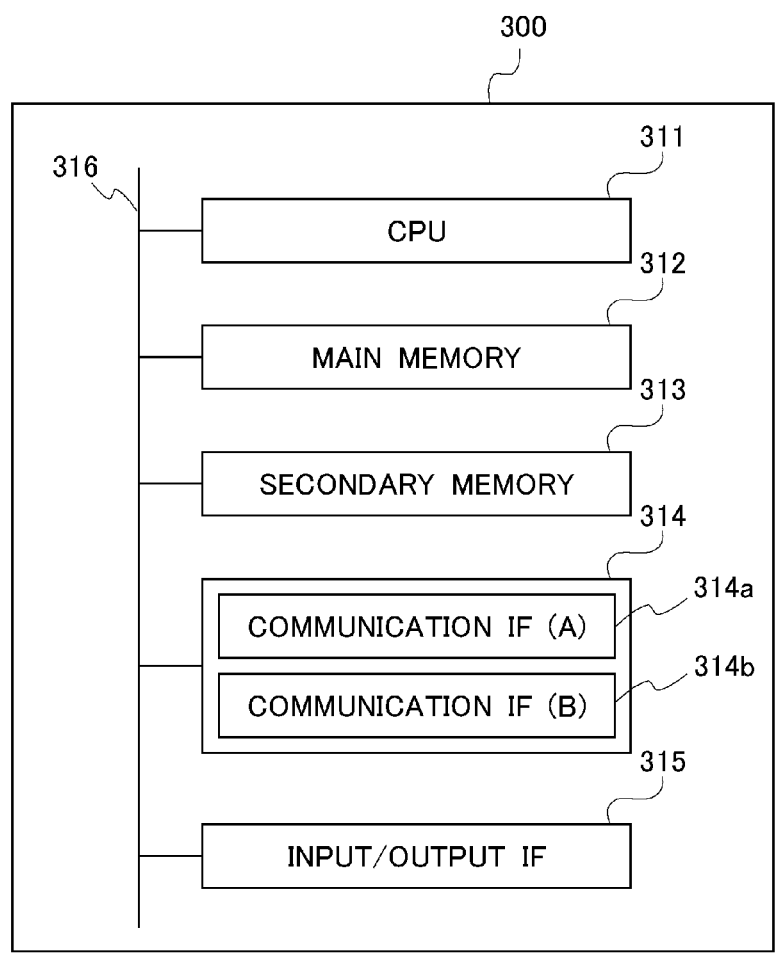
FIG. 2 is a diagram illustrating an example hardware configuration of a computer.

FIG. 2 is a diagram illustrating an example hardware configuration of the computer. The maintenance support server 10, the key information management server 20, the authentication unit 31, the on-board device 32, the terminal 40, and the terminal 50 in FIG. 1 are exemplified by a configuration of a computer 300 illustrated in FIG. 2.

The computer 300 includes a central processing unit (CPU) 311, a main memory 312, a secondary memory 313, a communication interface (IF) 314, and an input/output IF 315, which are interconnected by a connection bus 316. The main memory 312 and the secondary memory 313 are recording media which can be read by the computer 300. It is possible to include a plurality of each of the components, or not to include one or some of the components.

The CPU 311 is a central processing unit that controls the entire computer 300. The CPU 311 is also referred to as a microprocessor unit (MPU) or a processor. Additionally, the CPU 311 is not limited to a single processor, and may have a multiprocessor structure. Alternatively, a single CPU connected by a single socket may have a multicore structure. For example, the CPU 311 expands a program stored in the secondary memory 313 in a work area of the main memory 312 in an executable form, and controls a peripheral appliance through execution of the program, to thereby provide a function for a predetermined purpose. The vehicle maintenance support system 1 according to the present embodiment provides each processing function of the maintenance support server 10, the key information management server 20, the authentication unit 31, the on-board device 32, the terminal 40, and the terminal 50.

The main memory 312 stores a computer program that is executed by the CPU 311, data that is processed by the CPU 311, and the like. For example, the main memory 312 includes a flash memory, a random access memory (RAM), and a read only memory (ROM). The secondary memory 313 stores various programs and various types of data in a recording medium in a readable/writable manner. The secondary memory 313 is also referred to as an external memory. For example, the secondary memory 313 is a flash memory, an erasable programmable ROM (EPROM), silicon disk, or a hard disk drive (HDD) device. For example, an operating system (OS), various programs, and various tables are stored in the secondary memory 313. For example, the OS includes a communication interface program for transferring data to and from an external device or the like connected through the communication IF 314.

The communication IF 314 includes a communication IF (A) 314A as an interface to the network N, and a communication IF (B) 314B as a near field wireless communication interface for BLE communication or the like. The maintenance support server 10, the key information management server 20, and the on-board device 32 do not have to include the communication IF (B) 314B. The authentication unit 31 does not have to include the communication IF (A) 314A, which is an interface to the network N.

The input/output IF 315 is an interface for performing input/output of data to/from an appliance connected to the computer 300. For example, a pointing device such as a keyboard, a touch panel or a mouse, or an input device such as a microphone is connected to the input/output IF 315. The computer 300 receives, via the input/output IF 315, an operation instruction and the like from an operator operating the input device.

A display device such as an LCD, an electroluminescence (EL) panel or an organic EL panel, or an output device such as a speaker is also connected to the input/output IF 315. The computer 300 outputs, via the input/output IF 315, data or information processed by the CPU 311, and data or information stored in the main memory 312 and the secondary memory 313.

By executing programs by the CPU 311, the maintenance support server 10 in FIG. 1 at least provides information processing functions of the repair point detection unit 110, the repair necessity information acquisition unit 120, the intermediation processing unit 130, and the estimation processing unit 140. At least one of the processing functions mentioned above may alternatively be provided by a digital signal processor (DSP), an application specific integrated circuit (ASIC), a graphics processing unit (GPU) or the like. Furthermore, at least one of the processing functions mentioned above may be provided by a dedicated large scale integration (LSI) such as a field-programmable gate array (FPGA), a numeric data processor or an image processing processor, or another digital circuit.

The terminal 40 in FIG. 1 is connected to the maintenance support server 10 by execution of the support service application by the CPU 311. At the terminal 40, registration of the vehicle membership information is performed by operation input by the vehicle user. After vehicle membership registration, a notification is issued at a cycle, in units of months such as one month, regarding a vehicle state including a travel distance, an engine state, a brake state, a battery state, a use duration (travel duration) and the like of the registered vehicle 30. At the terminal 40, the received vehicle state is displayed, by execution of the support service application by the CPU 311, on a display device such as an LCD in the form of contents written in hypertext markup language (HTML) or the like.

Recommendation information regarding servicing/maintenance of the registered vehicle 30 is issued, together with the vehicle state, as repair necessity information in the form of a notification every specific period or every specific travel distance. At the terminal 40, the received repair necessity information is displayed, by execution of the support service application by the CPU 311, on the display device such as an LCD in the form of contents written in HTML or the like. The vehicle user views the vehicle state in the repair necessity information displayed on the LCD or the like, and determines whether the recommended servicing/maintenance is to be performed. For example, the vehicle user performs a valid operation on a radio button or the like added to the repair necessity information, and determines whether servicing/maintenance recommended for the vehicle 30 is to be performed. Additionally, notifications of recommendation information regarding regular servicing/maintenance may be issued by emails or SMS messages.

In the case where the vehicle state including the warning information or the diagnosis data of the vehicle 30 exceeds the allowable range, the repair necessity information is issued in the form of a notification, together with information, in the vehicle state, exceeding the allowable range. At the terminal 40, the received repair necessity information is displayed, by execution of the support service application by the CPU 311, on the display device such as an LCD in the form of contents written in HTML or the like. Alternatively, an audio message embedded in advance in the support service application is output. For example, the audio message includes a toll-free number or the like of a call center or the like which is in cooperation with the support agency and which is to receive a request for repair. As in the case described above, the vehicle user performs a valid operation on a radio button or the like added to the repair necessity information, and determines whether servicing/maintenance recommended for the vehicle 30 is to be performed. Alternatively, a request for repair may be performed by contacting the call center or the like output by the audio message.

The terminal 50 in FIG. 1 is connected to the maintenance support server 10 by execution of the support service application by the CPU 311. At the terminal 50, a notification regarding predetermined information about the vehicle user requesting for repair of the vehicle 30 for which regular servicing/maintenance is to be performed or a repair point is detected is issued by execution of the support service application by the CPU 311. The predetermined information at least includes the position information of the vehicle 30, the vehicle state information, information for specifying the vehicle user, and information for specifying the vehicle 30. The received predetermined information is displayed on a display device such as an LCD of the terminal 50 in the form of contents written in HTML or the like. The terminal 50 may also acquire, in response to a demand from the maintenance user, information about servicing/maintenance or repair of the vehicle 30, such as the latest repair necessity history or the vehicle state history of the vehicle 30, and may display the information on the display device.

<3. Flow of Processing>

In the following, each information processing by the repair point detection unit 110, the repair necessity information acquisition unit 120, the intermediation processing unit 130, and the estimation processing unit 140, provided by the maintenance support server 10, will be described with reference to the sequence diagrams in FIGS. 3 to 7. FIGS. 3 to 7 are sequence diagrams illustrating examples of flows of processing by the vehicle maintenance support system 1. For example, the maintenance support server 10 according to the present embodiment provides the processing illustrated in FIGS. 3 to 7 by reading and executing, by the CPU 311 or the like, various programs and various types of data stored in the secondary memory 313 or information stored in the maintenance support DB 200.

Additionally, a description will be given with respect to the maintenance support server 10, assuming that vehicle membership registration by the vehicle user and maintenance agency membership registration by the maintenance user are completed, and that the support service application for providing a movement support service is already installed in the terminal 40 and the terminal 50 possessed respectively by the vehicle user and the maintenance user.

Figure 3:
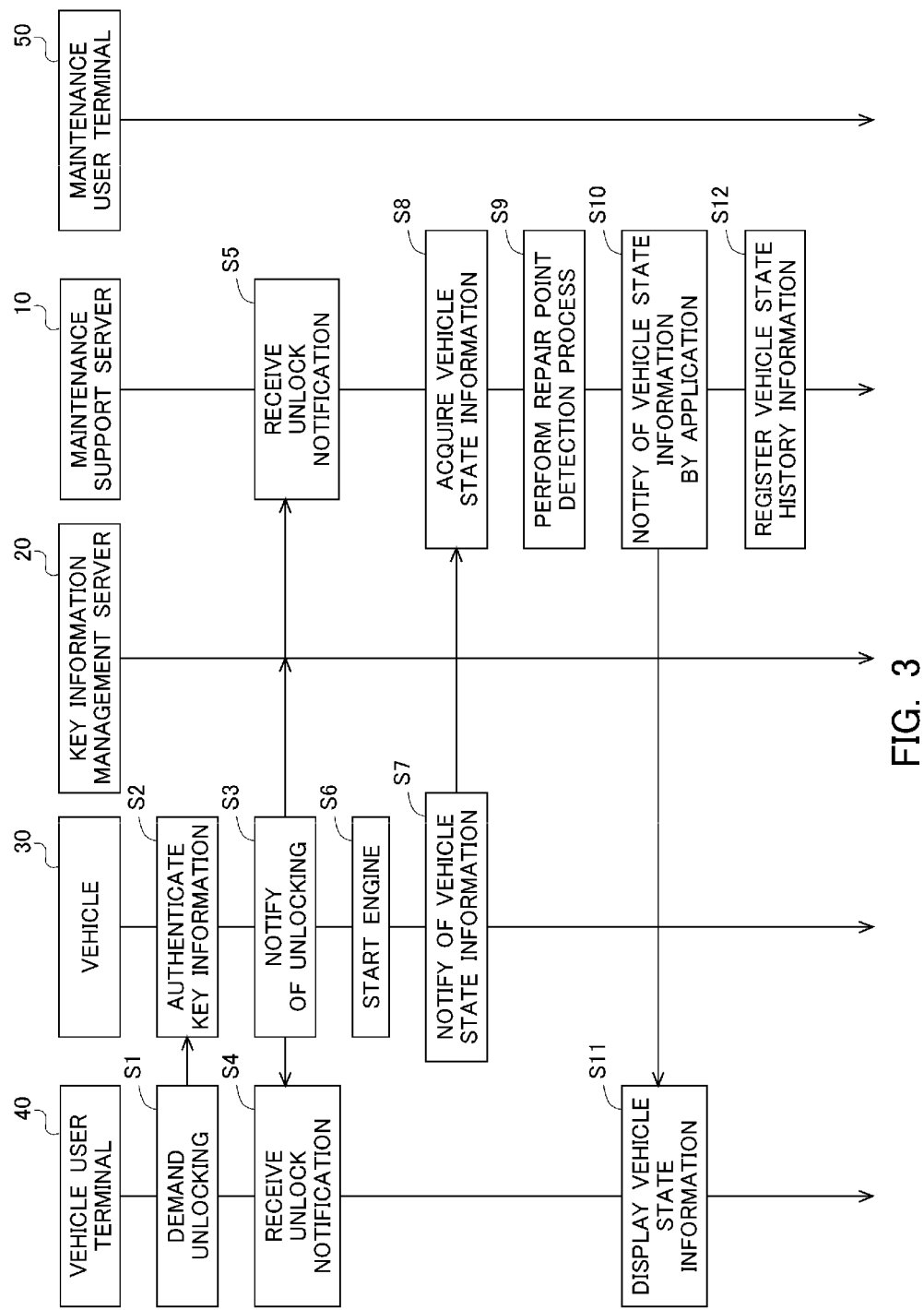
FIG. 3 is a sequence diagram illustrating an example flow of processing by the vehicle maintenance support system.

In FIG. 3, it is assumed that key information which is managed by the key information management server 20 and which is issued based on the vehicle-side authentication information of the vehicle 30 is already held by the terminal 40 of the vehicle user (Case 1 of Key Issuance). As described in Case 2 of Key Issuance, one of a pair of authentication information generated by the key information management server 20 may be held by the terminal 40 instead, the one being issued as the key information. In this case, of the pair of authentication information, the other piece of authentication information is held by the authentication unit 31 mounted in the vehicle 30 as the vehicle-side authentication information. Moreover, as described in Case 3 of Key Issuance, a locking/unlocking key and an engine start key of the vehicle 30 may already be held by the terminal 40.

For example, the vehicle user executes the support service application, and causes the terminal 40 holding the key information to operate as an electronic key for using the vehicle 30. For example, the terminal 40 transmits an unlock demand (releasing of entrance door, immobilizer, etc.) for the vehicle 30 through BLE communication (S1).

In Cases 1, 2 of Key Issuance, the vehicle 30 performs authentication of the key information transmitted from the terminal 40, based on the key information included in the unlock demand (S2). For example, the authentication unit 31 of the vehicle 30 receives, through BLE communication, the key information accompanying the unlock demand transmitted from the terminal 40, and performs authentication under a condition that the received key information corresponds to the vehicle-side authentication information stored in a memory or the like. The authentication unit 31 may generate, at the time of performing authentication, the vehicle-side authentication information by the same algorithm as that of the key information management server 20, based on information including the identification information of the vehicle 30 and the time information of reception of a notification from the maintenance support server 10.

Additionally, in Case 3 of Key Issuance, exchange of issued key information is directly performed through communication, at the vehicle 30, between the dedicated unit and the terminal 40, and thus, the process in S2 is omitted.

The vehicle 30 issues an unlock notification regarding the vehicle 30 to the terminal 40, with successful authentication or execution of unlocking as a trigger (S3). The terminal 40 receives the unlock notification from the vehicle 30 (S4). Additionally, the key information management server 20 and the maintenance support server 10 are notified of unlocking of the vehicle 30 (S5). The maintenance support server 10 temporarily stores time information of the unlock notification received from the vehicle 30 in a predetermined area in the main memory 312.

The vehicle user unlocks the vehicle 30 and starts the engine by using, as an electronic key, the terminal 40 which is successfully authenticated (S6; Cases 1, 2 of Key Issuance). In Case 3 of Key Issuance, the terminal 40 holding the locking/unlocking key and the engine start key of the vehicle 30 is used as an electronic key for performing exchange with the dedicated unit. The vehicle user drives the vehicle 30, which is started, and moves to a predetermined destination location.

The on-board device 32 of the vehicle 30 notifies of information about the vehicle state of the vehicle 30 (i.e., the vehicle state information), with start of the engine as the trigger (S7). For example, the on-board device 32 acquires, through the ECU connected to the in-vehicle network such as CAN, the travel distance, the engine state (idling engine speed), the brake state (wear state of brake pad, brake disc), and the battery state (state of charge, state of health). In the same manner, the on-board device 32 acquires the abnormality notification information (warning information), and the diagnosis data. Then, the on-board device 32 notifies the maintenance support server 10 of the vehicle state information, and position information of the vehicle 30 acquired through the GPS unit. Additionally, the vehicle state information which is transmitted to the maintenance support server 10 includes the identification information (IP address, MAC address, etc.) of the on-board device 32. The maintenance support server 10 acquires the vehicle state information, the position information and the like which have been transmitted from the on-board device 32 via the network N (S8). The maintenance support server 10 associates time information with the acquired vehicle state information and position information, and temporarily stores the resulting information in a predetermined area in the main memory 312. The processes in S8, S9 are performed through the repair point detection unit 110.

The repair point detection unit 110 of the maintenance support server 10 performs a repair point detection process on the vehicle 30, based on the vehicle state information and the like acquired in the process in S8 (S9). In the repair point detection process, presence/absence of notifications regarding regular servicing/maintenance of the vehicle 30 and a repair point which is desired to be repaired is specified based on the vehicle state determination information registered in the maintenance support DB 200 and the vehicle state information and the like acquired in the process in S8.

For example, the repair point detection unit 110 searches through vehicle membership information registered in the maintenance support DB 200 with the identification information (IP address, MAC address, etc.) of the on-board device 32 included in the vehicle state information as a search key, and extracts corresponding vehicle membership information. In the same manner, the repair point detection unit 110 searches through vehicle state determination information registered in the maintenance support DB 200, and extracts corresponding vehicle state determination information. The repair point detection unit 110 associates the extracted vehicle membership information and vehicle state determination information with the vehicle state information and the like acquired in the process in S8, and temporarily stores the resulting information in a predetermined area in the main memory 312.

For example, the repair point detection unit 110 calculates, for the vehicle 30, the number of elapsed days, based on a registration date of the vehicle 30 registered in the vehicle membership information and time information at a current time point. The repair point detection unit 110 also acquires a travel distance of the vehicle 30 at the current time point from the vehicle state information and the like acquired in the process in S8. Then, the repair point detection unit 110 compares a recommended period and a recommended distance for performing regular servicing/maintenance of the vehicle 30 included in the vehicle state determination information against the number of elapsed days and the travel distance, and determines whether to recommend regular servicing/maintenance.

The repair point detection unit 110 also compares the engine state (idling engine speed), the brake state (wear state of brake pad, brake disc), and the battery state (state of charge (SOC), state of health (SOH)) included in the vehicle state information and the like against the allowable ranges for the above-mentioned vehicle states included in the vehicle state determination information, and specifies that the vehicle states are within the allowable ranges.

In the same manner, the repair point detection unit 110 compares the warning information and the diagnosis data included in the vehicle state information and the like against the allowable ranges for the above-mentioned information included in the vehicle state determination information, and specifies that the warning information and the diagnosis data at the current time point are within the allowable ranges.

In the case where regular servicing/maintenance is not recommended, and in the case where the vehicle state information and the like acquired in the process in S8 is within the allowable range, the repair point detection unit 110 associates the extracted vehicle membership information with the vehicle state information, and passes on the resulting information to be processed in S10. Additionally, a case where regular servicing/maintenance is recommended, and a case where the vehicle state information and the like acquired in the process in S8 is not within the allowable range will be described later with reference to FIG. 5.

The maintenance support server 10 notifies the terminal 40 of the vehicle state information and the like passed on from the process in S9 (S10). The process in S10 is performed through the repair necessity information acquisition unit 120. For example, the repair necessity information acquisition unit 120 of the maintenance support server 10 specifies the IP address of the terminal 40 based on the identification information of the terminal 40 registered in the vehicle membership information, and notifies of information indicating the vehicle state at the current time point. The information indicating the vehicle state at the current time point includes the travel distance, a quality of the engine state, a quality of the brake state, the battery state (state of charge, state of health), and the like.

Additionally, during traveling of the vehicle, the processes in S8, S9 are performed with respect to the vehicle state information which is sampled every specific period or every specific travel distance. During traveling of the vehicle, the repair necessity information acquisition unit 120 may add position information, use duration (travel duration) and the like to the information indicating the vehicle state which is sampled every specific period or every specific travel distance, and notify the terminal 40 of the information.

At the terminal 40, the vehicle state information, the position information, the use duration (travel duration) and the like transmitted from the maintenance support server 10 are displayed, through the support service application, on the display device such as an LCD in the form of contents written in HTML or the like (S11). By viewing the contents displayed on the display device through the support service application, the vehicle user may grasp the travel distance, the travel time, a traveling location, the battery state (state of charge, etc.), and the quality of the engine state and the brake state.

For example, the repair necessity information acquisition unit 120 stores in the maintenance support DB 200, as the vehicle state history information, the vehicle state information, the time information (including year, month and day), and the position information acquired immediately after start of the engine (S12). During traveling of the vehicle, the repair necessity information acquisition unit 120 updates the vehicle state history information based on the vehicle state information which is sampled every specific period or every specific travel distance.

Next, FIG. 4 will be described.

Figure 4:
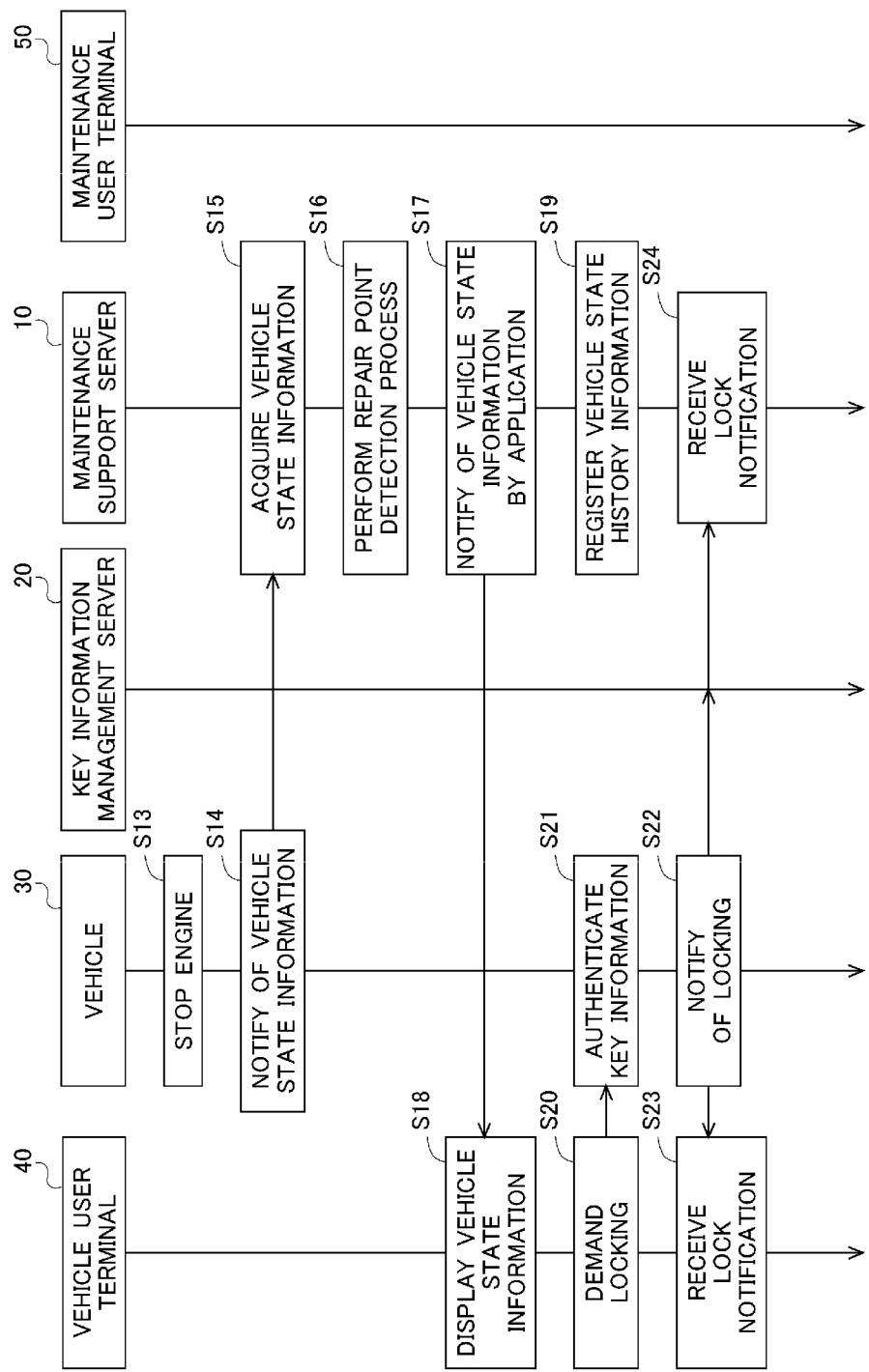
FIG. 4 is a sequence diagram illustrating an example flow of processing by the vehicle maintenance support system.

In FIG. 4, the vehicle user stops the engine by performing an engine stop operation (such as switching off of ignition) for the vehicle 30 (S13). The on-board device 32 of the vehicle 30 notifies of information about the vehicle state of the vehicle 30 (vehicle state information), with stop of the engine as a trigger (S14). Notification of the information about the vehicle state of the vehicle 30 in the process in S14 is performed in the same manner as the process in S7.

The maintenance support server 10 acquires the vehicle state information, the position information and the like transmitted from the on-board device 32 via the network N (S15). The maintenance support server 10 associates time information with the acquired vehicle state information and position information, and temporarily stores the resulting information in a predetermined area in the main memory 312. The processes in S15, S16 are performed through the repair point detection unit 110.

The repair point detection unit 110 of the maintenance support server 10 performs the repair point detection process the same as that in S9 on the vehicle 30, based on the vehicle state information and the like acquired in the process in S15 (S16). In the repair point detection process, presence/absence of notifications regarding regular servicing/maintenance of the vehicle 30 and a repair point which is desired to be repaired is specified based on the vehicle state determination information registered in the maintenance support DB 200 and the vehicle state information and the like acquired in the process in S15.

In the case where regular servicing/maintenance is not recommended, and in the case where the vehicle state information and the like acquired in the process in S15 is within the allowable range, the repair point detection unit 110 associates the extracted vehicle membership information with the vehicle state information, and passes on the resulting information to be processed in S17. A case where regular servicing/maintenance is recommended, and a case where the vehicle state information and the like acquired in the process in S15 is not within the allowable range will be described later.

In the processes from S17 to S19, the same processes as the processes from S10 to S12 in FIG. 3 are performed. For example, the repair necessity information acquisition unit 120 notifies the terminal 40 of information indicating the vehicle state, the position information, and the use duration (travel duration) acquired at the time when the engine is stopped (S17). At the terminal 40, the vehicle state information, the position information, the use duration (travel duration) and the like transmitted from the maintenance support server 10 are displayed, through the support service application, on the display device such as an LCD in the form of contents written in HTML or the like (S18). The repair necessity information acquisition unit 120 updates the vehicle state history information corresponding to the vehicle 30 and stored in the maintenance support DB 200, based on the vehicle state information, the time information (including year, month and day), and the position information acquired immediately after the engine is stopped (S19).

For example, the vehicle user executes the support service application, and causes the terminal 40 holding the key information to operate as an electronic key for locking the vehicle 30. For example, the terminal 40 transmits a lock demand (locking of entrance door, setting of immobilizer, etc.) for the vehicle 30 through BLE communication (S20).

In Cases 1, 2 of Key Issuance, the vehicle 30 performs authentication of the key information transmitted from the terminal 40, based on the key information included in the lock demand (S21). For example, the authentication unit 31 of the vehicle 30 receives, through BLE communication, the key information accompanying the lock demand transmitted from the terminal 40, and performs authentication under a condition that the received key information corresponds to the vehicle-side authentication information stored in a memory or the like. The authentication unit 31 may generate, at the time of performing authentication, the vehicle-side authentication information by the same algorithm as that of the key information management server 20, based on information including the identification information of the vehicle 30 and the time information of reception of a notification from the maintenance support server 10.

Additionally, in Case 3 of Key Issuance, exchange of issued key information is directly performed through communication, at the vehicle 30, between the dedicated unit and the terminal 40, and thus, the process in S21 is omitted.

The vehicle 30 issues a lock notification regarding the vehicle 30 to the terminal 40, with successful authentication or execution of locking as a trigger (S22). The terminal 40 receives the lock notification from the vehicle 30 (S23). Additionally, the key information management server 20 and the maintenance support server 10 are notified of locking of the vehicle 30 (S24). The maintenance support server 10 temporarily stores time information of the lock notification received from the vehicle 30 in a predetermined area in the main memory 312.

Next, a case where regular servicing/maintenance is recommended, and a case where the vehicle state information and the like is not within the allowable range will be described with reference to FIG. 5.

Figure 5:
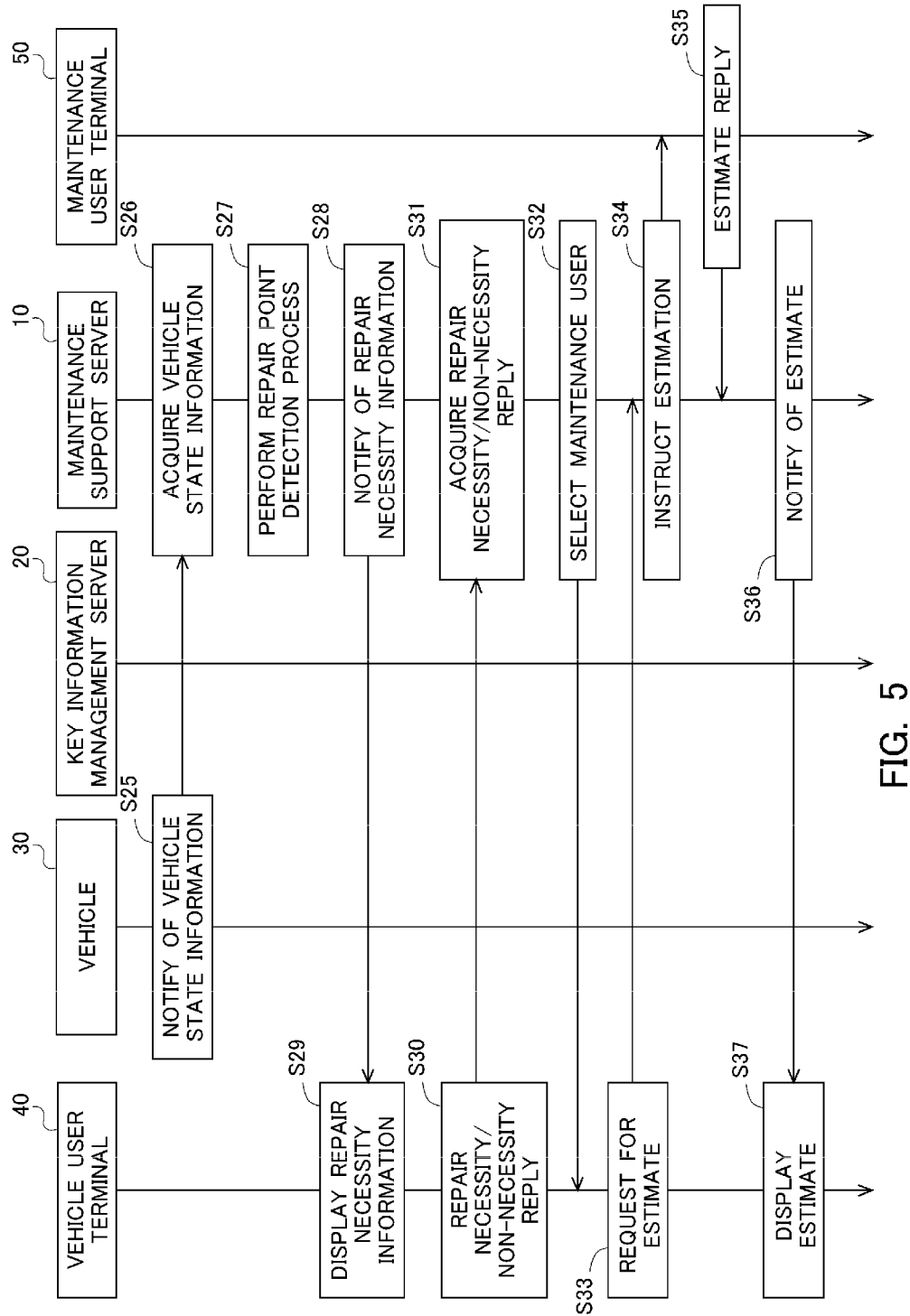
FIG. 5 is a sequence diagram illustrating an example flow of processing by the vehicle maintenance support system.

In FIG. 5, the on-board device 32 of the vehicle 30 notifies the maintenance support server 10 of information about the vehicle state of the vehicle 30 (vehicle state information) at a predetermined timing (S25). The predetermined timing here may be start/stop of the engine, a specific period or a specific travel distance at the time of traveling, or the like. The predetermined timing may also be a time of occurrence of an alarm based on the warning information or the diagnosis data in the vehicle state information, for example. As described above, the vehicle state information which is issued in the process in S25 is acquired by the maintenance support server 10 together with the identification information (IP address, MAC address, etc.) of the on-board device 32 and the position information of the vehicle 30 (S26). The maintenance support server 10 associates time information with the acquired vehicle state information and position information, and temporarily stores the resulting information in a predetermined area in the main memory 312.

The maintenance support server 10 performs the repair point detection process on the vehicle 30 through the repair point detection unit 110, in the same manner as the process in S9 (S27). The repair point detection unit 110 specifies presence/absence of notifications regarding regular servicing/maintenance of the vehicle 30 and a repair point which is desired to be repaired, based on the vehicle state determination information registered in the maintenance support DB 200 and the vehicle state information and the like acquired in the process in S26.

For example, the repair point detection unit 110 searches through vehicle membership information registered in the maintenance support DB 200 with the identification information (IP address, MAC address, etc.) of the on-board device 32 included in the vehicle state information as a search key, and extracts corresponding vehicle membership information. In the same manner, the repair point detection unit 110 searches through vehicle state determination information registered in the maintenance support DB 200, and extracts corresponding vehicle state determination information. The repair point detection unit 110 associates the extracted vehicle membership information and vehicle state determination information with the vehicle state information and the like acquired in the process in S26, and temporarily stores the resulting information in a predetermined area in the main memory 312.

For example, the repair point detection unit 110 calculates, for the vehicle 30, the number of elapsed days, based on a registration date of the vehicle 30 registered in the vehicle membership information and time information at the current time point. The repair point detection unit 110 also acquires a travel distance of the vehicle 30 at the current time point from the vehicle state information and the like acquired in the process in S26. Then, the repair point detection unit 110 compares a recommended period and a recommended distance for performing regular servicing/maintenance of the vehicle 30 included in the vehicle state determination information against the number of elapsed days and the travel distance, and determines whether to recommend regular servicing/maintenance.

The repair point detection unit 110 also compares the engine state (idling engine speed), the brake state (wear state of brake pad, brake disc), and the battery state (state of charge (SOC), state of health (SOH)) included in the vehicle state information and the like against the allowable ranges for the above-mentioned vehicle states included in the vehicle state determination information, and specifies that the vehicle states are within the allowable ranges.

In the same manner, the repair point detection unit 110 compares the warning information and the diagnosis data included in the vehicle state information and the like against the allowable ranges for the above-mentioned information included in the vehicle state determination information, and specifies that the warning information and the diagnosis data at the current time point are within the allowable ranges.

In FIG. 5, in a case where regular servicing/maintenance is recommended, or in a case where the vehicle state information (including warning information, diagnosis data) and the like acquired in the process in S26 is not within the allowable range, the repair point detection unit 110 notifies the terminal 40 of the vehicle user of the repair necessity information (S28). The process in S28 is performed through the repair necessity information acquisition unit 120. In the following, the case where regular servicing/maintenance is recommended, or the case where the vehicle state information (including warning information, diagnosis data) and the like acquired in the process in S26 is not within the allowable range will be collectively referred to also as "state where a repair point is detected".

For example, the repair necessity information acquisition unit 120 specifies the IP address of the terminal 40 based on the identification information of the terminal 40 registered in the vehicle membership information. Then, the repair necessity information acquisition unit 120 notifies of the vehicle state information of the vehicle 30 in the state where a repair point is detected, together with the repair necessity information, with the specified IP address of the terminal 40 as a destination. The vehicle state information for the state where a repair point is detected includes the travel distance, the quality of the engine state, the quality of the brake state, the battery state (state of charge, state of health), and the like. In the same manner, the vehicle state information for the state where a repair point is detected includes the vehicle state information (warning information, diagnosis data) for when exceeding of the allowable range is detected. For example, the position information of the vehicle 30, the time information and the like at a time point of detection of the repair point may be associated with the vehicle state information for the state where a repair point is detected, and the terminal 40 may be notified of the resulting information.

For example, at the terminal 40, the vehicle state information of the vehicle 30 in the state where a repair point is detected is displayed, together with the repair necessity information, on the display device such as an LCD in the form of contents written in HTML or the like (S29), through the support service application. For example, type information (warning information, diagnosis data) indicating the vehicle state for when exceeding of the allowable range is detected is displayed on the display device of the terminal 40, together with the vehicle state information for the state described above. A radio button or the like for indicating whether repair is necessary for the vehicle 30 in the state where a repair point is detected (or whether recommended servicing/maintenance is to be performed) is added to the repair necessity information.

In the case where regular servicing/maintenance is recommended, the recommended period and the recommended distance for performing regular servicing/maintenance of the vehicle 30 registered in advance as the vehicle state determination information are displayed together with the vehicle state information and the repair necessity information of the vehicle 30 at the current time point. The vehicle user views the contents displayed on the display device of the terminal 40 through the support service application, and specifies whether the recommended regular servicing/maintenance is to be performed (repair necessity/non-necessity reply, S30). Whether the recommended regular servicing/maintenance is to be performed is specified through a valid operation on a radio button or the like added to the repair necessity information. Additionally, in the case where regular servicing/maintenance is recommended, the maintenance support server 10 may notify of the vehicle state information and the repair necessity information by an SMS message based on a telephone number or an email address of the terminal 40 registered in advance in the vehicle membership information.

For example, in the case where the vehicle state information including the warning information and the diagnosis data, and the like is not within the allowable range, the type information of the vehicle state indicating a repair point which is not within the allowable range is displayed together with the repair necessity information and the allowable range registered in the vehicle state determination information as a basis for repair point detection. Alternatively, the vehicle state information, the position information, the time information and the like of the vehicle 30 for which a repair point is detected may be displayed. A radio button or the like for indicating necessity/non-necessity of repair of the vehicle 30 in the state where a repair point is detected is added to the repair necessity information.

Additionally, with respect to a case where the vehicle state information including the warning information and the diagnosis data, and the like is not within the allowable range, there is a case which demands swift handling such as when airbag inflation is detected. In such a case, the repair necessity information acquisition unit 120 may cause an audio message embedded in advance in the support service application to be output, for example. For example, the audio message includes a toll-free number or the like of a call center or the like which is in cooperation with the support agency and which is to receive a request for repair.

As in the case where regular servicing/maintenance is recommended, the vehicle user performs a valid operation on a radio button or the like added to the repair necessity information, and determines a repair instruction for the vehicle 30 in the state where a repair point is detected (repair necessity/non-necessity reply, S30). Alternatively, the call center or the like output by the audio message may be contacted to request for repair.

The maintenance support server 10 acquires the repair necessity/non-necessity reply transmitted from the terminal 40 (S31). For example, the repair necessity information acquisition unit 120 of the maintenance support server 10 temporarily stores the repair necessity/non-necessity reply acquired in S31 in a predetermined area in the main memory 312, in association with the IP address of the terminal 40, the identification number of the support service application, and the time information of acquisition.

In the case where the repair necessity/non-necessity reply acquired in the process in S31 indicates that repair is necessary, the repair necessity information acquisition unit 120 proceeds to the process in S32. In the case where the repair necessity/non-necessity reply acquired in the process in S31 indicates that repair is not necessary, the repair necessity information acquisition unit 120 proceeds to the process in S40. In the process in S40, the repair necessity information acquisition unit 120 stores, in the maintenance support DB 200, as the repair necessity history information, the vehicle state information for the state where a repair point is detected, the position information, the time information (including year, month and day), and the repair necessity/non-necessity reply.

Additionally, during traveling of the vehicle, the vehicle state history information is updated based on the vehicle state information which is sampled every specific period or every specific travel distance. For example, in the case where the repair necessity/non-necessity reply acquired in the process in S31 indicates that repair is not necessary, the repair necessity information acquisition unit 120 does not have to record the result of the repair necessity/non-necessity reply until a notification regarding the vehicle state information at the time of stop of the engine is acquired.

In the case where the repair necessity/non-necessity reply acquired in the process in S31 indicates that repair is necessary, the repair necessity information acquisition unit 120 specifies the vehicle 30 in the state where a repair point is detected, from the IP address or the like of the terminal 40. The repair necessity information acquisition unit 120 associates the information for specifying the vehicle 30, the vehicle state information for the state where a repair point is detected, the position information, and the time information with the repair necessity/non-necessity reply acquired in the process in S31, and passes on the resulting information to the intermediation processing unit 130 and the estimation processing unit 140.

In the case where the repair necessity/non-necessity reply acquired in the process in S31 indicates that repair is necessary, the maintenance support server 10 selects a maintenance user who is to perform the repair work for the vehicle 30 in the state where a repair point is detected (S32). The process in S32 is performed through the intermediation processing unit 130.

The intermediation processing unit 130 searches through repair necessity history information in the maintenance support DB 200 with the information for specifying the vehicle 30 passed on from the repair necessity information acquisition unit 120 as a search key, and extracts the repair necessity history information corresponding to the vehicle 30 in the state where a repair point is detected. For example, in the case where the repair necessity/non-necessity reply passed on from the repair necessity information acquisition unit 120 indicates that regular servicing/maintenance is to be performed, the intermediation processing unit 130 selects the maintenance user related to latest servicing/maintenance in the extracted repair necessity history information as the maintenance user who is to perform the repair task.

Additionally, in the case where the repair necessity history information corresponding to the vehicle 30 does not exist in the maintenance support DB 200, the intermediation processing unit 130 searches through the vehicle membership information registered in the maintenance support DB 200 with the information for specifying the vehicle 30 as a search key, and extracts the vehicle membership information corresponding to the vehicle 30. Then, the intermediation processing unit 130 may refer to the maintenance agency membership information based on the vehicle identification information included in the extracted vehicle membership information, and specify the maintenance user of a corporate group which manufactures/sells the vehicles 30. With respect to specification of the maintenance user, a plurality of maintenance users having service locations or maintenance locations in a region including the address or the like of the vehicle user may be selected, for example.

For example, in the case where the repair necessity/non-necessity reply passed on from the repair necessity information acquisition unit 120 is a repair instruction for the case where the vehicle state information and the like indicated by the vehicle 30 is not within the allowable range, the intermediation processing unit 130 may specify the maintenance user based on the position information of the vehicle 30.

For example, the intermediation processing unit 130 searches for the vehicle membership information in the maintenance support DB 200 based on the information for specifying the vehicle 30. Then, the intermediation processing unit 130 refers to the maintenance agency membership information based on the vehicle identification information included in the retrieved vehicle membership information, and may specify the maintenance user, in a corporate group which manufactures/sells the vehicles 30, having a service location or a maintenance location in a region including the position information of the vehicle 30.

The intermediation processing unit 130 notifies the terminal 40 of the vehicle user of selected maintenance user information including a name of the selected maintenance user, contact details and the like. The intermediation processing unit 130 also passes the selected maintenance user information including the name of the selected maintenance user, the contact details and the like to the estimation processing unit 140. Additionally, the intermediation processing unit 130 may notify of the selected maintenance user information by adding a radio button or the like for demanding an estimate of cost related to servicing/maintenance or a repair work. The processes from S33 to S37 are processes for a case where there is an estimate demand (estimate request) with respect to the selected maintenance user information which is transmitted to the terminal 40.

For example, at the terminal 40, the selected maintenance user information including the radio button or the like for demanding an estimate is displayed, through the support service application, on the display device such as an LCD in the form of contents written in HTML or the like. The vehicle user views the contents displayed on the display device of the terminal 40 through the support service application, and demands an estimate of cost related to servicing/maintenance or a repair work through a valid operation on the radio button or the like added to the selected maintenance user information (S33).

The maintenance support server 10 receives the estimate demand which is transmitted from the terminal 40 and which is for cost related to servicing/maintenance or a repair work. Then, the maintenance support server 10 performs an estimation process, from S34 to S36, for cost related to servicing/maintenance or a repair work for the vehicle 30, based on the selected maintenance user information, the information for specifying the vehicle 30, the vehicle state information for the state where a repair point is detected, the position information, the time information and the like. The estimation process from S34 to S36 is performed through the estimation processing unit 140.

The estimation processing unit 140 issues an estimation instruction based on the selected maintenance user information passed on from the intermediation processing unit 130 and the information for specifying the vehicle 30, the vehicle state information for the state where a repair point is detected, the position information, the time information and the like passed on from the repair necessity information acquisition unit 120 (S34). The estimation processing unit 140 searches through maintenance agency membership information registered in the maintenance support DB 200, based on the selected maintenance user information, and extracts the identification information of a terminal which is to receive an estimation request. In the case where a plurality of maintenance users are included in the selected maintenance user information, identification information of a terminal which is to receive an estimation request is extracted for each maintenance user. Additionally, in the mode illustrated in FIG. 5, estimation instruction and estimate reply are performed through the terminal 50.

The estimation processing unit 140 issues, to each of the extracted terminals (terminals 50), of the maintenance users, which are to receive an estimation request, an estimation instruction including the information for specifying the vehicle 30, the vehicle state information for the state where repair point is detected, the position information, the time information and the like which are passed on from the repair necessity information acquisition unit 120. The maintenance user estimates cost related to servicing/maintenance or a repair work based on the information for specifying the vehicle 30, the vehicle state information for the state where a repair point is detection, the position information, the time information and the like included in the estimation instruction. The maintenance support server 10 is notified of the estimated cost related to servicing/maintenance or a repair work (estimate reply, S35). Additionally, the estimate which is transmitted in the process in S35 includes a work breakdown of servicing/maintenance which can be handled without moving the vehicle 30 to a maintenance location, such as replenishment of battery electrolyte and replenishment of washer fluid, for example.

The estimation processing unit 140 receives the estimate reply of each maintenance user, and also associates the received estimate reply with the identification information of the maintenance user, the information for specifying the vehicle 30, the vehicle state information for the state where a repair point is detected, the position information, the time information and the like, and temporarily stores the resulting information in a predetermined area in the main memory 312.

Furthermore, the estimation processing unit 140 searches through vehicle membership information registered in the maintenance support DB 200 based on the information for specifying the vehicle 30, and extracts the vehicle membership information of the corresponding vehicle user. Then, the estimation processing unit 140 calculates remuneration for a support service based on the fee schedule or the like for the support service included in the extracted vehicle membership information of the vehicle user. The estimation processing unit 140 adds the calculated remuneration for the support service to the estimate reply from each maintenance user, and calculates a total cost related to servicing/maintenance or a repair work for the vehicle 30 in the state where a repair point is detected. The estimation processing unit 140 issues the calculated total cost to the terminal 40 as an estimate notification (S36).

Additionally, the estimation processing unit 140 may issue the estimate notification by adding, to the total cost calculated for each maintenance user, a radio button or the like for specifying the maintenance user. For example, at the terminal 40, the total cost calculated for each maintenance user and the radio button or the like for specifying the maintenance user are displayed, through the support service application, on the display device such as an LCD in the form of contents written in HTML or the like (estimate display, S37).

Next, FIG. 6 will be described.

Figure 6:
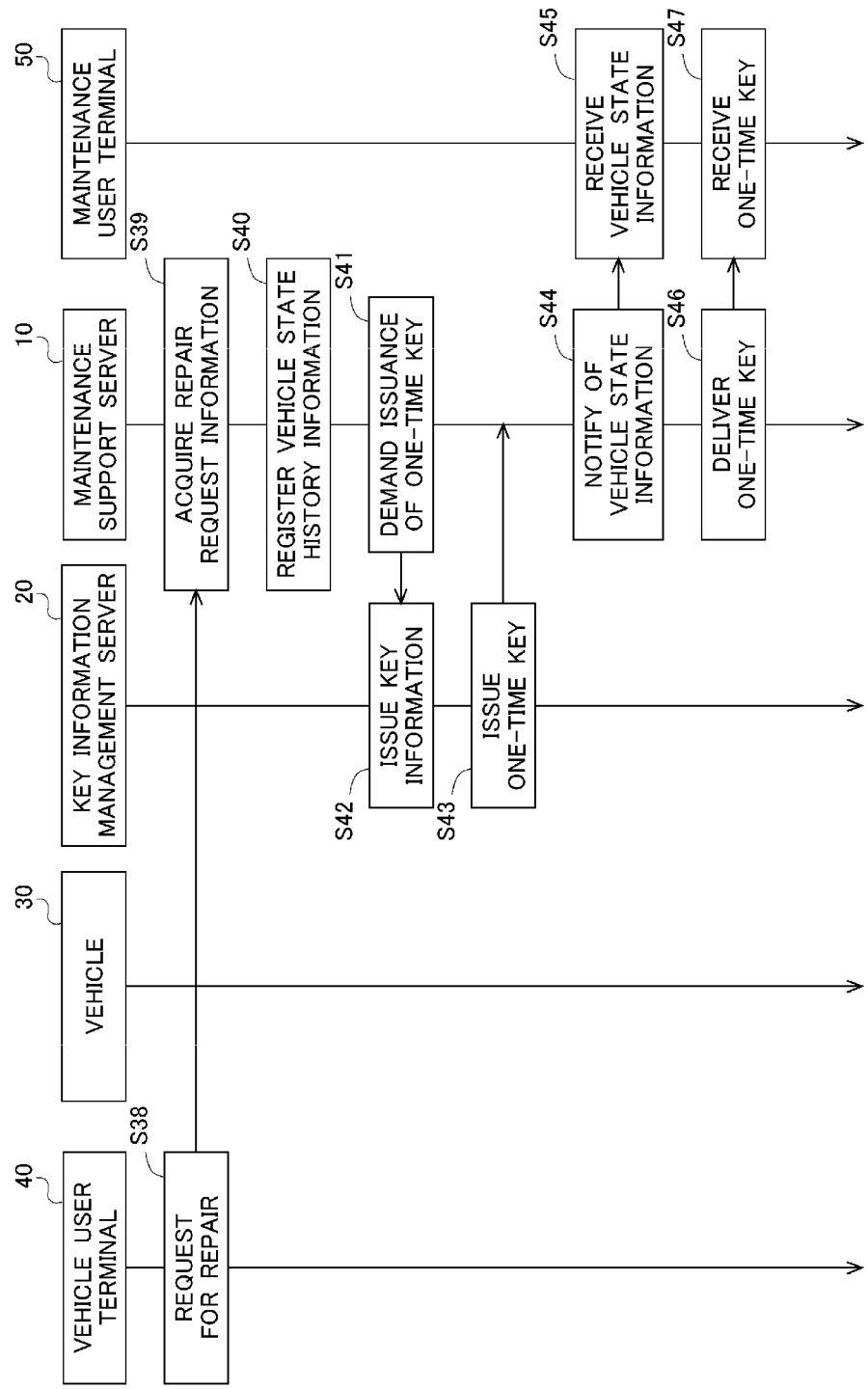
FIG. 6 is a sequence diagram illustrating an example flow of processing by the vehicle maintenance support system.

In FIG. 6, the vehicle user views the estimate notification displayed on the display device of the terminal 40, and issues a repair request (S38). The repair request includes specification of a maintenance user for servicing/maintenance or a repair work for the vehicle 30 for which a repair point is detected. Specification of a maintenance user is performed through a valid operation on the radio button or the like added to the total cost calculated for each maintenance user.

The maintenance support server 10 acquires repair request information transmitted from the terminal 40 (S39). For example, the repair necessity information acquisition unit 120 of the maintenance support server 10 stores the repair request information acquired in S39 in the maintenance support DB 200 as the repair necessity history information (S40). For example, the repair request information acquired in S39 is stored in the maintenance support DB 200 after being associated with the vehicle state information for the state where a repair point is detected, the position information, the time information (including year, month and day), necessity/non-necessity of repair, the information for specifying the maintenance user, presence/absence of an estimate, and the like.

The maintenance support server 10 demands the key information management server 20 to issue a one-time key (S41). For example, the maintenance support server 10 notifies the key information management server 20 of an issuance demand, for a one-time key, including the vehicle identification information of the vehicle 30 for which a repair point is detected and the identification information of a maintenance user for servicing/maintenance or a repair work. Additionally, the maintenance support server 10 may notify of an issuance demand, for a one-time key, including a repair mode such as servicing/maintenance which can be handled without moving the vehicle 30 to a maintenance location, such as replenishment of battery electrolyte and replenishment of washer fluid.

The key information management server 20 receives the notification regarding the issuance demand for a one-time key from the maintenance support server 10, and issues the key information (S42). For example, the key information management server 20 associates the time information of reception with the vehicle identification information of the vehicle 30 included in the issuance demand for a one-time key, and temporarily stores the resulting information in a predetermined area in the main memory 312. Then, the key information management server 20 issues the key information for causing the terminal 50 to function as a temporary electronic key, based at least on the vehicle identification information of the vehicle 30 and the time information.

In Case 1 of Key Issuance, the key information management server 20 issues a one-time key based on the vehicle-side authentication information combined with the vehicle identification information of the vehicle 30, and the time information, for example. In Case 2 of Key Issuance, the key information management server 20 issues a pair of one-time keys based on the vehicle identification information of the vehicle 30, the time information and the like, for example. In Case 3 of Key Issuance, the key information management server 20 issues a one-time key for temporarily validating the locking/unlocking key and the engine start key for the vehicle 30 based on the time information.

Additionally, the key information management server 20 may also issue the key information according to the maintenance user for servicing/maintenance or a repair work, or a repair mode such as servicing/maintenance which can be handled without moving the vehicle 30 to a maintenance location.

The key information management server 20 passes on the issued key information to the maintenance support server 10 as the one-time key (S43). The maintenance support server 10 delivers the one-time key issued by the key information management server 20 to the terminal 50 (S44). The terminal receives the one-time key delivered by the maintenance support server 10, and temporarily stores the one-time key in a predetermined area in the main memory 312 (S45).

Additionally, in the case where the repair request is issued without a demand for an estimate of cost related to servicing/maintenance or a repair work in the process in S33, the maintenance support server 10 notifies the terminal 50 of the maintenance user at least of the information for specifying the vehicle 30, the vehicle state information for the state where a repair point is detected, and the position information (S46). The terminal 50 receives the information transmitted from the maintenance support server 10, and temporarily stores the information in a predetermined area in the main memory 312 (S47).

Next, FIG. 7 will be described.

Figure 7:
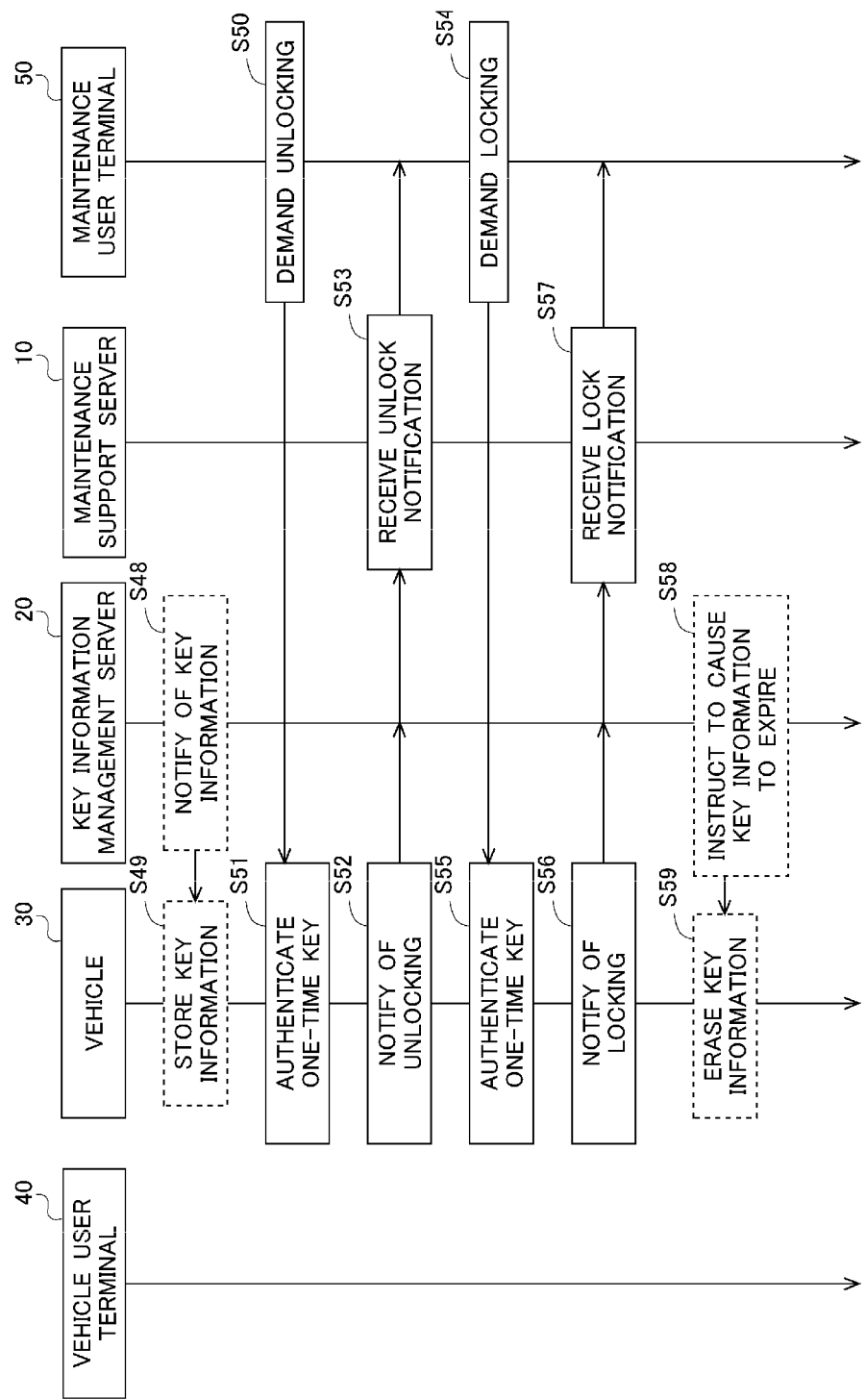
FIG. 7 is a sequence diagram illustrating an example flow of processing by the vehicle maintenance support system.

In FIG. 7, the processes in S48, S49 indicated by broken-line frames are the processes for Case 2 of Key Issuance. In Case 2 of Key Issuance, the key information management server 20 may notify the vehicle 30 of the vehicle-side authentication information which is paired with the key information issued to the terminal 50 in the process in S42 (S48). For example, the authentication unit 31 mounted in the vehicle 30 receives the vehicle-side authentication information transmitted from the key information management server 20 through the on-board device 32, and temporarily stores the received vehicle-side authentication information in a predetermined area in the main memory 312 (S49).

Alternatively, the authentication unit 31 may generate, at the time of performing authentication, the vehicle-side authentication information by the same algorithm as that of the key information management server 20, based on information including the identification information of the vehicle 30 and the time information of reception of the notification from the maintenance support server 10.

The maintenance user specifies the vehicle 30 in the state where a repair point is detected, based on the information for specifying the vehicle 30, the position information and the like which the maintenance user is notified of in the process in S46 or at the time of estimation instruction in S34. Then, the maintenance user executes the support service application, and causes the terminal 50, which received the key information, to operate as a temporary electronic key for using the vehicle 30. For example, the terminal 50 transmits an unlock demand for the vehicle 30 through BLE communication (S50). Additionally, in the case where a repair mode for the vehicle 30 for which a repair point is detected is a mode which can be handled without moving the vehicle 30 to a maintenance location, such as replenishment of battery electrolyte or replenishment of washer fluid, a scope of use of the electronic key may be limited to releasing of the entrance door, the rear gate or the immobilizer, for example.

In Cases 1, 2 of Key Issuance, the vehicle 30 performs authentication of the one-time key transmitted from the terminal 50, based on the key information included in the unlock demand (S51).

For example, the authentication unit 31 of the vehicle 30 receives, through BLE communication or the like, the key information accompanying the unlock demand transmitted from the terminal 50, and performs authentication under a condition that the received key information corresponds to the vehicle-side authentication information stored in a memory or the like. Alternatively, the authentication unit 31 may generate, at the time of performing authentication, the vehicle-side authentication information by the same algorithm as that of the key information management server 20, based on information including the identification information of the vehicle 30 and the time information of reception of the notification from the maintenance support server 10.

In Case 3 of Key Issuance, exchange of issued key information is directly performed through communication, at the vehicle 30, between the dedicated unit and the terminal 50, and thus, the process in S51 is omitted.

The vehicle 30 issues an unlock notification regarding the vehicle 30 to the terminal 50, with successful authentication or execution of unlocking as a trigger (S52). The key information management server 20 and the maintenance support server 10 are also notified, through the on-board device 32, of unlocking of the vehicle 30 (S53). The maintenance support server 10 temporarily stores time information of the unlock notification received from the vehicle 30 in a predetermined area in the main memory 312.

In Cases 1, 2 of Key Issuance, the maintenance user performs unlocking of the vehicle 30 according to a repair mode, by using the terminal 50 which is successfully authenticated as an electronic key. For example, in the case of a repair mode which can be handled without moving the vehicle 30 to a maintenance location, the maintenance user unlocks the entrance door or the rear gate, and performs a process of replenishment of battery electrolyte, washer fluid or the like. In a repair mode which requires movement to a maintenance location, the maintenance user unlocks the entrance door and releases the immobilizer, and starts the engine of the vehicle 30, for example.

In Case 3 of Key Issuance, the terminal 50 holding the locking/unlocking key and the engine start key for the vehicle 30 is used as the electronic key. The maintenance user drives the started vehicle 30, and moves the vehicle 30 to a maintenance location where the detected repair point is to be treated. Then, the repair point is repaired.

The maintenance user who completed repair which could be handled without movement to a maintenance location, or the maintenance user who drove the vehicle 30 and has moved to a maintenance location transmits a lock demand to the vehicle 30 through the terminal 50 which operates as the electronic key (S54).

The vehicle 30 performs authentication of the one-time key transmitted from the terminal 50, based on the key information included in the lock demand (S55). The authentication unit 31 of the vehicle 30 receives, through BLE communication or the like, the key information accompanying the lock demand transmitted from the terminal 50, and performs authentication under a condition that the received key information corresponds to the vehicle-side authentication information stored in a memory or the like. Alternatively, the authentication unit 31 may generate, at the time of performing authentication, the vehicle-side authentication information by the same algorithm as that of the key information management server 20, based on information including the identification information of the vehicle 30 and the time information of reception of the notification from the maintenance support server 10.

In Case 3 of Key Issuance, exchange of issued key information is directly performed through communication, at the vehicle 30, between the dedicated unit and the terminal 50, and thus, the process in S55 is omitted.

The vehicle 30 issues a lock notification regarding the vehicle 30 to the terminal 50, with successful authentication or execution of locking as a trigger (S56). The key information management server 20 and the maintenance support server 10 are also notified, through the on-board device 32, of locking of the vehicle 30 (S57). The maintenance support server 10 temporarily stores time information of the lock notification received from the vehicle 30 in a predetermined area in the main memory 312.

The processes in S58, S59 indicated by broken-line frames are the processes for Case 2 of Key Issuance. In Case 2 of Key Issuance, the key information management server 20, which received the lock notification, notifies the vehicle 30 of an instruction to cause the key information expire (S58). The authentication unit 31 mounted in the vehicle 30 receives the key information expiration instruction transmitted from the key information management server 20 through the on-board device 32, and also erases the vehicle-side authentication information that is temporarily stored in a predetermined area in the main memory 312 (S59).

Additionally, the authentication unit 31 may hold as an expiration list, in the memory, a condition for issuance of a one-time key, such as a combination of the identification information of the vehicle 30 and the time information. The authentication unit 31 may prohibit issuance of a one-time key for authentication for the terminal 50, based on the combination of the identification information of the vehicle 30 and the time information included in the expiration list.

Alternatively, the maintenance support server 10 which received the lock notification may notify the terminal 50 of an instruction to erase the key information. The support service application of the terminal 50 may erase the key information that is temporarily stored in a predetermined area in the main memory 312 of the terminal 50, based on the instruction transmitted from the maintenance support server 10 to erase the key information.

The maintenance support server 10 may measure a time slot when a support service is provided, the number of times of use or the like, based on the unlock notification received in the process in S53 and the lock notification received in the process in S57, and reflect the same in remuneration. The maintenance support server 10 is enabled to bill according to a use period, based on the unlock notification and the lock notification for the vehicle.

Effects of Embodiment

With the vehicle maintenance support system according to the present embodiment, a repair agency can swiftly repair a vehicle for which a repair point which is desired to be repaired is detected, by using a mobile terminal to which key information is transmitted as a temporary electronic key for using the vehicle. The repair agency can unlock the vehicle by using the mobile terminal which operates as the electronic key, and can operate the vehicle which does not require movement or can move the vehicle to a maintenance location according to a repair mode.

The key information management server 20 can issue the key information which can be used with limited authority according to the degree or mode of repair. Because the authority is limited, the vehicle user can entrust maintenance of the vehicle without feeling anxious.

With the vehicle maintenance support system according to the present embodiment, a repair agency carrying the terminal to which the key information is transmitted is enabled to drive the vehicle as a temporary key manager, and convenience is increased. Consent for repair is obtained from the vehicle user according to the state of the vehicle without the vehicle user finely checking maintenance of the vehicle, and an appropriate maintenance service is provided. Burdens regarding maintenance, such as the vehicle user having to be present at the time of maintenance of the vehicle or the vehicle user having to drive the vehicle and hand over the vehicle at the repair location, can be eliminated. Even if a driver moves away from a vehicle parked on an expressway or the like, a repair agency carrying the terminal to which the key information is transmitted can collect the vehicle.

Furthermore, with the vehicle maintenance support system according to the present embodiment, information indicating a state of the vehicle, including a repair point of the vehicle, can be presented to a repair agency. The repair agency can prepare for a repair work based on the information indicating the state of the vehicle, and can increase an estimation accuracy regarding a cost or a time for repair Furthermore, with the vehicle maintenance support system according to the present embodiment, an estimation request can be issued to one or more repair agencies, and estimated costs can be presented to the vehicle user. The vehicle user can select a repair agency for the vehicle for which a repair point is detected, based on the presented estimated costs.

Moreover, with the vehicle maintenance support system according to the present embodiment, the key information can include valid period information of the key information in accordance with a mode of repair, and the use period of a mobile terminal that operates as the electronic key can be limited. Use of a mobile terminal that operates as the electronic key beyond the valid period can be prevented.

With the vehicle maintenance support system according to the present embodiment, in a case where a notification to the effect that the vehicle is locked based on issued key information is received, the key information can be made to expire, and a repair work on the vehicle for which a repair point is detected can be strictly managed with the notification of locking as a trigger.

<4. Modification>

The embodiment described above is merely an example, and the present disclosure can be changed as appropriate within the scope of the disclosure.

In the embodiment, a mode of issuing a temporary key information, or authentication information to a maintenance user who is registered in the maintenance support server 10 is described, but the key information may alternatively be issued to a provider of a road service for moving the vehicle 30 for which a repair point which is desired to be repaired is detected. Such a provider of a road service is specified through arrangement or referral by a maintenance user, or through arrangement or referral by an insurance company or the like registered in the vehicle membership information. The maintenance support server 10 may receive information about the provider of a road service specified through such arrangement or referral, and issue the support service application and a temporary key information to a mobile terminal possessed by the provider.

Furthermore, the embodiment describes a maintenance support service which uses a one-time key and which is performed for the vehicle 30 for which a repair point is detected, but the target of maintenance support may be two-wheelers such as bicycles and motorcycles, or may be ships, airplanes, or appliances such as drones. For example, an appliance which is a support target in the modification includes an authentication unit which can use the key information, which is managed by the key information management server 20, as a one-time key for locking and unlocking. The authentication unit performs communication of a lock/unlock demand including the key information, between the authentication unit and a mobile terminal that operates as a one-time key, and a use mode not requiring handing of a key is enabled. For example, the same effect can be achieved even if a target of maintenance support is a facility having an authentication unit which can use the key information, which is managed by the key information management server 20, as a one-time key for locking and unlocking. Such a facility may be a photovoltaic or wind power generation facility which uses natural energy, a gas power generation facility, a thermal power generation facility, or an atomic power generation facility.

The above-described embodiment describes a vehicle maintenance support system 1 which includes the vehicle maintenance support server 10 and the key information management server 20. However, the process performed for the key information issued by the key information management server 20, that is, the authentication information for the authentication unit 31, is not limited to the vehicle maintenance support service, and is applicable to various services related to vehicles. For example, when the washing service of a vehicle is received, the authentication information may be temporarily issued to a mobile terminal of an agent providing the washing service of a vehicle to allow the agent to unlock and lock the vehicle. For example, when the substitute driving service of a vehicle is received, the authentication information may be temporarily issued to a mobile terminal of an agent providing substitute driving of a vehicle to allow the agent to unlock/lock the vehicle and start the engine or the motor which is a power source. That is, the authentication information is temporarily issued to a mobile terminal of the agent providing various services related to vehicles by the key information management server 20 and the authentication unit 31 mounted in the vehicle of the above-described embodiment to allow the agent to unlock and lock the vehicle and start the engine or the motor which is a power source, thereby the vehicle user can temporarily pass the vehicle on to the agent safely and easily.

In the above-described embodiment, the maintenance support server 10 detects a repair point of the vehicle 30 based on the information stored in the maintenance support DB 200 and the vehicle state information from the vehicle 30, and the like. The maintenance support server 10 notifies the terminal 40 of the vehicle user of information including a detected repair point, by the support service application, an email, or a short message service (SMS). The maintenance support server 10 acquires repair necessity information including necessity/non-necessity of repair transmitted from the vehicle user in response to the notification mentioned above, and also selects a maintenance user who is to repair the vehicle 30 to transmit the authentication information, when consent is obtained for repair. Instead of such a process, the service support server cooperating with the key information management server 20 may be provided. The service support server may provide the recommendation information about various services to the user, and transmit the authentication information to the agent providing service when consent is obtained for provision of the service from the vehicle user.

Furthermore, even when the service support server does not provide the recommendation information to the user, the service similar to the above-described embodiment is executable. For example, using the instruction from the vehicle user to receive a service as a trigger, the service support server may transmit the authentication information to the agent providing the service. For example, the service support server transmits the authentication information when the provision of service is desired from the vehicle user. For example, in the road service and the substitute driving service, it is assumed that the service support server performs the process using the instruction from the vehicle user to receive the service as a trigger.

In the above-described embodiment, the vehicle maintenance support system 1 includes the vehicle maintenance support server 10 and the key information management server 20. However, the vehicle maintenance support system 1 is not limited to such a configuration. For example, the vehicle maintenance support server 10 and the key information management server 20 may be present on the same computer. That is, the vehicle maintenance support system 1 may execute the acquirer (process of the vehicle maintenance support server 1) configured to acquire necessity information from a terminal of a user of the vehicle on a single server, and information manager (process of the key information management server 20) configured to issue authentication information for temporarily using the vehicle. Also, the vehicle maintenance support system 1 may include the vehicle maintenance support server 10 and the key information management server 20 on a cloud.

<<Computer-Readable Recording Medium>>

A program for causing an information processing apparatus or another machine or device (hereinafter "computer or the like") to realize any of the functions described above may be recorded in a recording medium which can be read by the computer or the like. The computer or the like may read and execute the program in the recording medium to thereby provide the function.

The recording medium which can be read by the computer or the like refers to a recording medium which accumulates information such as data and programs electrically, magnetically, optically, mechanically or by chemical action and which can be read by the computer or the like. Among such recording mediums, those that can be removed from the computer or the like include a flexible disc, a magneto-optic disc, a CD-ROM, a CD-R/W, a DVD, a Blu-ray disc, a DAT, an 8 mm tape, a memory card such as a flash memory, and the like. Recording mediums that are fixed to the computer or the like include a hard disk, a ROM, and the like.

What is claimed is:

1. A support apparatus comprising a computer including a processor for executing programs stored in memory, the computer configured to execute:

acquiring necessity information about necessity/non-necessity of provision of a service related to a vehicle from a terminal of a user of the vehicle; and issuing, when the necessity information indicates that the provision of the service is necessary, authentication information for temporarily validating key information for using the vehicle to an agency providing the service to a terminal owned by an agent providing the service, wherein the authentication information for obtaining authentication by an authentication unit, which is provided in the vehicle, wherein the authentication unit transmits the key information to an ECU which is provided in the vehicle after issuing the authentication information received from the terminal owned by the agent, and the ECU executes at least one of locking or unlocking the vehicle, and starting a power source of the vehicle when the ECU receives the key information.

2. The support apparatus according to claim 1, wherein the vehicle has a keyless entry system, the authentication information is information for validating smart key information input to the keyless entry system of the vehicle when the vehicle is used.

3. The support apparatus according to claim 1, wherein the service is repair of the vehicle, and the computer issues the authentication information to a repair agency who performs the repair of the vehicle when the necessity information indicates that repair of the vehicle is necessary.

4. The support apparatus according to claim 3, further comprising unit configured to detect a repair point of the vehicle, wherein
when the necessity information indicates that repair is necessary for the repair point, the computer notifies a repair agency who performs repair of the repair point of information indicating a state of the vehicle.

5. The support apparatus according to claim 3, the computer configured to issue an estimation request to one or more repair agencies, wherein
the computer issues the authentication information to a repair agency selected from the one or more repair agencies.

6. The support apparatus according to claim 1, wherein the authentication information includes valid period information in accordance with a mode of the service.

7. The support apparatus according to claim 1, wherein in a case where a notification that the vehicle is locked based on the authentication information that is issued is received, the computer causes the authentication information to expire.

8. The support apparatus according to claim 1, the computer further configured to: generate a pair of authentication information; and
configured to issue one piece of the authentication information to the terminal as the key information and issue another piece of the authentication information to the authentication unit.

9. A support method performed by a computer including a processor for executing programs stored in memory, the method comprising:
a step of acquiring necessity information about necessity/non-necessity of provision of a service related to a vehicle from a terminal of a user of the vehicle; and
a step of issuing, when the necessity information indicates that the provision of the service is necessary, authentication information for temporarily validating key information for using the vehicle to an agency providing the service to a terminal owned by an agent providing the service, wherein the authentication information for obtaining authentication by an authentication unit which is provided in the vehicle,
wherein the authentication unit transmits the key information to an ECU which is provided in the vehicle after issuing the authentication information received from the terminal owned by the agent, and the ECU executes at least one of locking or unlocking the vehicle, and starting a power source of the vehicle when the ECU receives the key information.

10. A program for causing a computer including a processor for executing programs stored in memory to perform:
a step of acquiring necessity information about necessity/non-necessity of provision of a service related to a vehicle from a terminal of a user of the vehicle; and
a step of issuing, when the necessity information indicates that the provision of the service is necessary, authentication information for temporarily validating key information for using the vehicle to an agency providing the service to a terminal owned by an agent providing the service, wherein the authentication information for obtaining authentication by an authentication unit, which is provided in the vehicle, and
the authentication unit transmits the key information to an ECU which is provided in the vehicle after issuing the authentication information received from the terminal owned by the agent, and the ECU executes at least one of locking or unlocking the vehicle, and starting a power source of the vehicle when the ECU receives the key information.

11. A support system comprising:
a vehicle; and
a computer including a processor for executing programs stored in memory configured to issue authentication information for the vehicle, wherein
the vehicle comprises:
an ECU configured to execute at least one of locking or unlocking the vehicle and starting a power source of the vehicle when the ECU receives key information; and
an authentication unit configured to transmit, after authentication by authentication information for temporarily validating key information for using the vehicle, the key information to the ECU, and wherein
the computer further configured to execute:
acquiring necessity information about necessity/non-necessity of provision of a service related to a vehicle from a terminal of a user of the vehicle; and
issuing, when the necessity information indicates that the provision of the service is necessary, the authentication information to an agency providing the service to a terminal owned by an agent providing the service, wherein
the authentication unit transmits the key information to the ECU after issuing the authentication information received from the terminal owned by the agent.

* * * * *